US012572644B2

(12) United States Patent
Doshi et al.

(10) Patent No.: US 12,572,644 B2
(45) Date of Patent: Mar. 10, 2026

(54) MICRO-ENCLAVES FOR INSTRUCTION-SLICE-GRAINED CONTAINED EXECUTION OUTSIDE SUPERVISORY RUNTIME

(71) Applicant: INTEL CORPORATION, Santa Clara, CA (US)

(72) Inventors: Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 774 days.

(21) Appl. No.: 17/711,768

(22) Filed: Apr. 1, 2022

(65) Prior Publication Data

US 2022/0222337 A1 Jul. 14, 2022

(51) Int. Cl.
*G06F 21/53* (2013.01)

(52) U.S. Cl.
CPC ........ *G06F 21/53* (2013.01); *G06F 2221/034* (2013.01)

(58) Field of Classification Search
CPC ........................... G06F 21/53; G06F 2221/034
See application file for complete search history.

(56) References Cited

U.S. PATENT DOCUMENTS

| | | | | |
|---|---|---|---|---|
| 10,691,457 B1 * | 6/2020 | Kountanis | ............... | G06F 9/384 |
| 2002/0073316 A1 * | 6/2002 | Collins | ................. | H04L 9/3247 |
| | | | | 713/174 |

| | | | | |
|---|---|---|---|---|
| 2003/0009620 A1 * | 1/2003 | Solomon | ............... | G06F 9/3814 |
| | | | | 712/E9.055 |
| 2010/0138608 A1 * | 6/2010 | Rappoport | .......... | G06F 12/0806 |
| | | | | 711/123 |
| 2017/0177457 A1 * | 6/2017 | Swanson | ............. | G06F 11/1016 |
| 2018/0113811 A1 * | 4/2018 | Xing | ..................... | G06F 12/109 |
| 2019/0102538 A1 * | 4/2019 | Gentili | ................... | G06F 21/53 |
| 2019/0310974 A1 * | 10/2019 | Pishe | ...................... | G06F 16/00 |
| 2019/0332427 A1 * | 10/2019 | Tian | ......................... | G06F 21/78 |
| 2020/0125742 A1 * | 4/2020 | Kounavis | .............. | H04L 9/0822 |
| 2020/0150734 A1 * | 5/2020 | Ma | .......................... | G06F 9/544 |

(Continued)

OTHER PUBLICATIONS

"Intel® 64 and IA-32 Architectures Software Developer's Manual", Order No. 325462-076US, Intel Corp., 4830 pages (Dec. 2021).

(Continued)

*Primary Examiner* — Michael Simitoski
*Assistant Examiner* — Zhe Liu
(74) *Attorney, Agent, or Firm* — Schwabe, Williamson & Wyatt, P.C.

(57) ABSTRACT

The present disclosure describes a micro-enclave (μenclave) framework including μenclave operations, which are library functions that split off from normal code execution. The μenclaves contain a mix of stateful and stateless operations, including such steps as reading or writing various hardware registers or resource counters in operating system, timer setup, deferring preemption events by a small value within a threshold set by the operating system, and the like. The operations in a μenclave, even though performed at a user level privilege, are compiled by a separate compilation sequence and installed unforgeably as static and unforgeable procedure collections that do not yield control to an operating system scheduler.

25 Claims, 8 Drawing Sheets

(56) References Cited

U.S. PATENT DOCUMENTS

| | | | |
|---|---|---|---|
| 2021/0089321 A1* | 3/2021 | Liu | G06F 9/3856 |
| 2021/0157682 A1* | 5/2021 | Antonopoulos | G06F 16/2379 |
| 2021/0232676 A1* | 7/2021 | Gingell | G06F 21/62 |
| 2022/0229565 A1* | 7/2022 | Saby | G06F 12/1416 |
| 2022/0269797 A1* | 8/2022 | Saby | G06F 21/602 |

OTHER PUBLICATIONS

Thomas E. Anderson, "The Case for Application-Specific Operating Systems", Proceedings of 3rd IEEE Workshop on Workstation Operating Systems, pp. 92-94 (1992), https://homes.cs.washington.edu/~tom/pubs/app-spec.pdf.

Young et al., "The True Cost of Containing: A gVisor Case Study", 11th USENIX Conference on Hot Topics in Cloud Computing (HotCloud 19), pp. 16-16 (Jul. 8, 2019), https://www.usenix.org/system/files/hotcloud 19-paper-young.pdf.

Katz et al., Unforgeable Encryption and Chosen Ciphertext Secure Modes of Operation, In Goos et al. (eds), Fast Software Encryption (FSE 2000), Lecture Notes in Computer Science, vol. 1978, Springer, Berlin, Heidelberg (2001, available online Jan. 18, 2002), https://link.springer.com/chapter/10.1007/3-540-44706-7_20.

Porter et al., "Rethinking the Library OS from the Top Down", Proceedings of the sixteenth Int'l Conference on Architectural Support for Programming Languages and Operating Systems, pp. 291-304 (Mar. 5, 2011), https://www.microsoft.com/en-us/research/wp-content/uploads/2016/02/asplos2011-drawbridge.pdf.

Tazaki et al., Library Operating System with Mainline Linux Network Stack, Proceedings of netdev 0.1, (Feb. 2015), http://libos-nuse.github.io/files/netdev01-tazaki.pdf.

Chia-Che Tsai, "Library OS is the New Container", https://events19.linuxfoundation.org/wp-content/uploads/2017/12/Library-OS-is-the-New-Container-Why-is-Library-OS-A-Better-Option-for-Compatibility-and-Sandboxing-Chia-Che-Tsai-UC-Berkeley.pdf, 38 pages (2017).

* cited by examiner

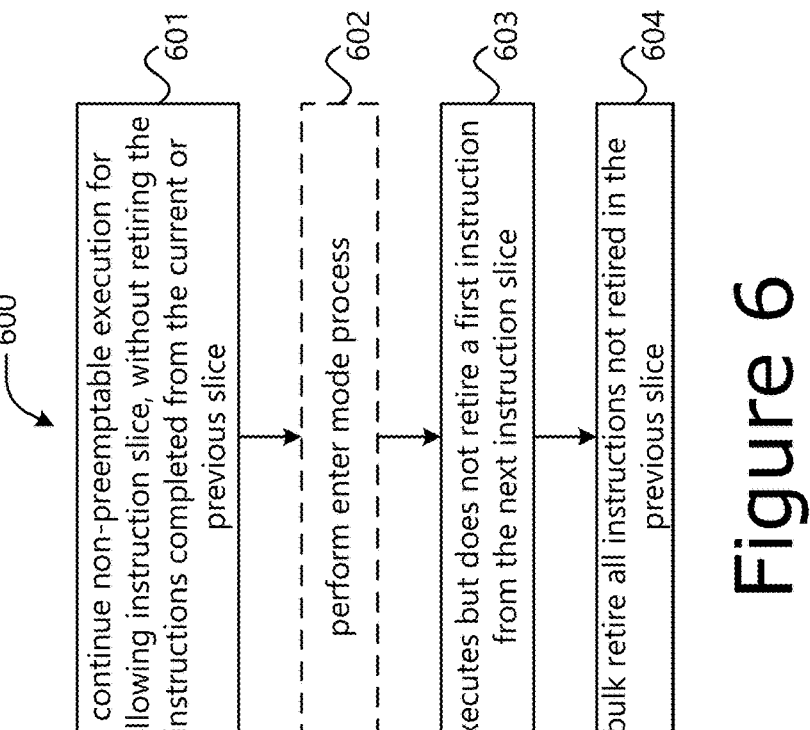

600

601 — continue non-preemptable execution for following instruction slice, without retiring the instructions completed from the current or previous slice 602 — perform enter mode process 603 — Executes but does not retire a first instruction from the next instruction slice 604 — bulk retire all instructions not retired in the previous slice

501 — bulk retire all instructions not retired in enter mode

502 — Unmask interrupts

503 — Implement load fence and/or store fence

955 cloud 944

Figure 9:
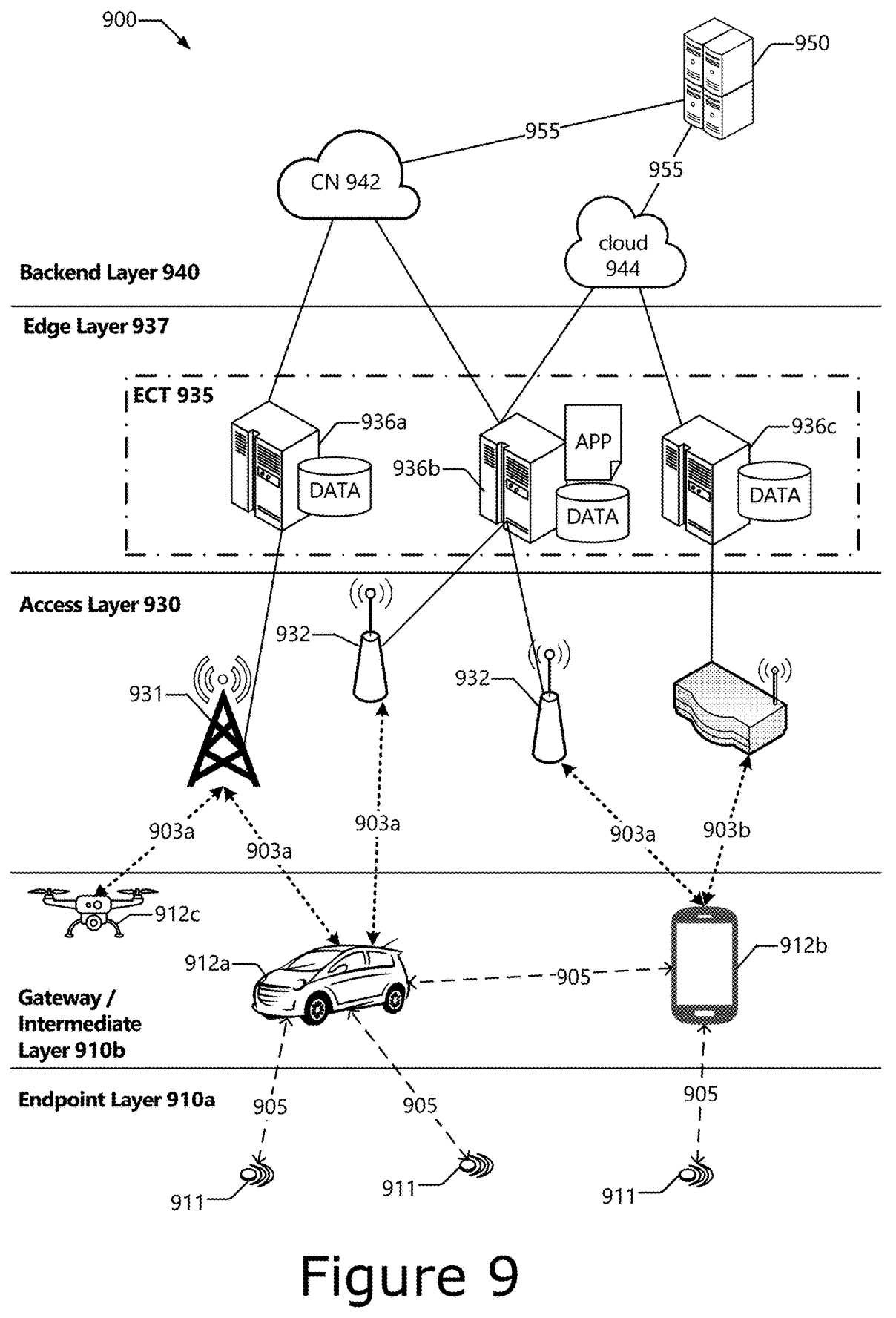

Backend Layer 940

Edge Layer 937

ECT 935

936a

APP

936b

DATA

DATA

936c

DATA

Access Layer 930

932

931

932

903a

903a

903a

903a

903b

912c

912a

905

912b

Gateway / Intermediate Layer 910b

Endpoint Layer 910a    905    905    905

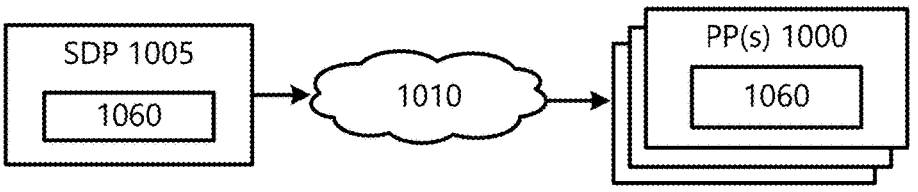

Figure 10

```
1150
    1156 —
    processor 1152          acceleration
    ┌──────────────┐        circuitry 1164
    │instructions 1181│
    └──────────────┘        1166   ┌─1166y─┐                edge devices
                                    └───────┘                   1162
    trusted execution       ┌1166x┐
    environment 1190        └─────┘    ┌─1166z─┐         edge cloud
                                       └───────┘            1163

┌─1160                network
    memory 1154                 interface 1168
    ┌──────────────┐
    │instructions 1182│                                   sensors 1172
    └──────────────┘        external
                            interface 1170                actuators 1174
    storage 1158
    ┌──────────────┐                                      pos 1175
    │instructions 1183│     battery 1176
    └──────────────┘
                            battery
    output circuitry 1184   monitor /        power block
                            charger 1178        1180
    input circuitry 1186
```

Figure 11

MICRO-ENCLAVES FOR INSTRUCTION-SLICE-GRAINED CONTAINED EXECUTION OUTSIDE SUPERVISORY RUNTIME

TECHNICAL FIELD

The present disclosure is generally related to edge computing, cloud computing, trusted execution environments, and computer security, and in particular, to micro-enclaves (µenclaves) for selective, instruction-slice-granular, lightweight, bounded-latency, contained execution, without entering a supervisory runtime.

BACKGROUND

Enclave based execution is a hardware assisted code-security and confidentiality approach in which sensitive applications are run in their own containers with a suitably designed library form of an operating system that supports such execution. The idea is to sharply reduce the TCB and dependence on VMMs and OSes that have large code footprints (and therefore are more vulnerable to snooping and subversion). However, the associated complexity of software (SW) enabling, attestation, and secure onboarding/offboarding of applications is a bridge too far for many applications. As a result, intermediate or layered forms of isolation in which sandboxes like gVisor are implemented at user level and kernel interactions are funneled through proxies (e.g., sidecars, gofer processes, and/or the like) are gaining traction. These however attach a performance tax of the additional level of filtering, funneling, and proxying, which as reported recently (see e.g., Young et al., *The True Cost of Containing: A gVisor Case Study*, 11TH USENIX CONFERENCE ON HOT TOPICS IN CLOUD COMPUTING (HOTCLOUD 19), pp. 16-16 (8 Jul. 2019) ("[Young]")) can be quite forbidding.

At the same time, the µservice decomposition trend that is greatly popular increases interaction costs and complexities due to inter-process or inter-domain signaling. There is a need to provide more efficient and incremental mechanisms for delivering security, privacy, access control, etc. where it is needed within code, instead of only doing so through coarse grained isolation. This is true especially for edge/data center where latency critical microservice and Function-as-a-Service (FaaS) codes perform very tight computations with a need for extremely lightweight but frequent interactions with one another and with infrastructure, but today have to take multiple heavyweight transfers of control (e.g., syscalls, context switches, and the like).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 5 depicts an example leave mode process.
FIG. 6 depicts an example connect mode process.

FIG. 9 illustrates an example edge computing environment.
FIG. 10 illustrates an example software distribution platform.
FIG. 11 depicts example components of a compute node, which may be used in edge computing system(s).

DETAILED DESCRIPTION

1. Micro-Enclaves

Figures 1, 3:
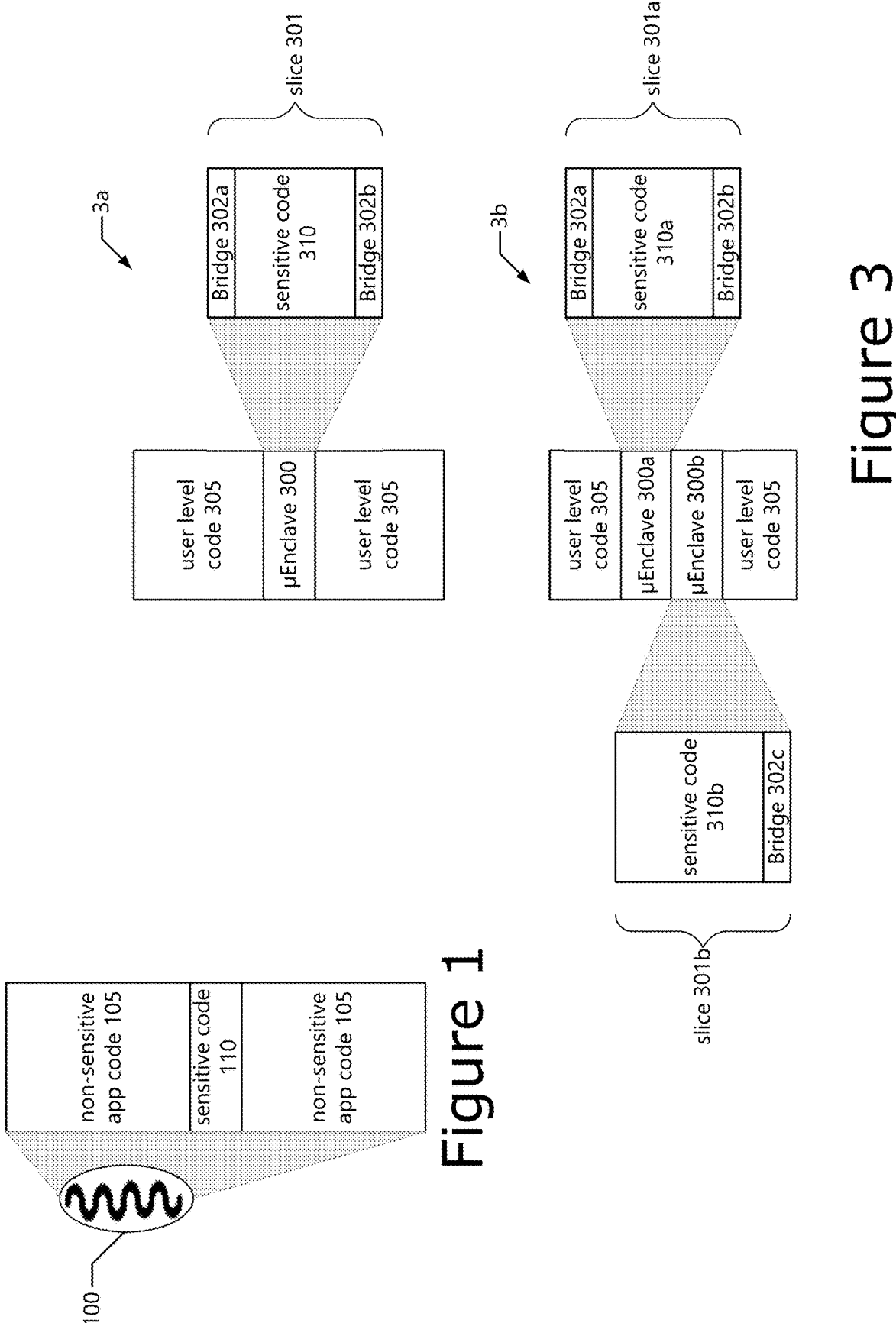
FIG. 1 depicts an example code block.
FIG. 3 depicts example micro-enclaves (µenclaves).

FIG. 1 depicts an example application (app) thread 100 including sensitive code 110 (also referred to as "privileged code 110" or the like) between non-sensitive app code 105*a* and 105*b*. Here, the app thread 100 performs normal app code 105, but frequently needs to interact with other apps and/or other threads by executing some sensitive code 110.

Many latency sensitive and/or confidential apps need to execute code in a sandbox or other secure environment that they control intimately. At the same time, they need to enjoy very predictable in-memory, cache-friendly execution for their performance sensitive hot code paths. Examples for edge and cloud computing frameworks (see e.g., FIG. 9) include virtual network functions (VNFs) and special purpose and persistent in-memory key-value stores, which need to handle billions or trillions of micro-transactions and real-time queries. Furthermore, in many scenarios, such as with providing microservices, there are often transitions that take place between normal app code 105 and privileged code 110, which requires entering a secure environment or performing a context switch. Switching between contexts in this way can produce substantial overhead in terms of compute and energy resource consumption.

The sensitive code 110 may be very small in quantity and heavily optimized to work correctly and finish with very low latency, or have very low latency requirements (e.g., QoS class and/or service level agreements (SLAs)). Additionally or alternatively, the sensitive code 110 may use resources meant only to be used during execution of the sensitive code 110, and not be used outside the sensitive code 110 context. For example, the sensitive code 110 may be non-pre-emptible code and/or may touch read or write model-specific registers (MSRs). Additionally or alternatively, the sensitive code 110 can acquire and release a spin-lock or may try to acquire a spin lock, although this is generally not considered safe for a preemptable thread.

The sensitive code 110 may also translate a handle (e.g., a reference) to a pointer, and use that pointer to read or write data that is jointly accessed by other processes, virtualization and/or OS containers, VMs, and/or the like. Additionally or alternatively, the sensitive code 110 may be transactional in nature (e.g., all-or-nothing). Here, there may be two outcomes of executing the sensitive code 110: either a logical operation in the sensitive code 110 completes and causes a durable side effect or it does not complete and has no side effects. Further, the sensitive code 110 needs to be obscured from all but a very small number of actors, for example, because it itself accesses secrets or traverses sensitive data structures The present disclosure provides means for the sensitive code 110 to be co-developed alongside normal (non-sensitive) code 105 of an app's source code, but for the sensitive code 110 to be compiled, linked, and loaded into the app through hardware (HW) assisted means such that the sensitive code 110 is unforgeably (or non-forgeably) exercised from the app's logic. The net effect is for the app to experience a library operating system (LibOS) like capability within its execution container for that sensitive code; yet, the application may continue to invoke normal operating system (OS) calls for other purposes that are not latency sensitive and generally not frequent.

There are various existing schemes for separating sensitive (privileged) code 110 from application code including using OS or LibOS in a trusted domain. LibOS is a very attractive approach if executed in a confidential container, but has many vulnerabilities if not executed within a confidential container.

Another existing approach includes using sandboxes such as gVisor (see e.g., [Young]), which is an application kernel, written in Go, that implements a substantial portion of the Linux system call interface and provides an additional layer of isolation between running applications and the host OS. However, sandboxes such as gVisor have flexibility and performance issues.

Other existing approaches include several very lightweight system calls (syscalls) with little to no side-effects (e.g., getpid, gettimeofday, and/or the like) were furnished as a virtual shared dynamic object (vDSO) so that a user to kernel transition can be avoided for such syscalls. A vDSO is a kernel mechanism for exporting a carefully selected set of kernel space routines to user space applications so that applications can call these kernel space routines in-process, without incurring the performance penalty of a mode switch from user mode to kernel mode that is inherent when calling these same kernel space routines by means of the system call interface. However, vDSO is not general enough in that vDSO is only usable for a very limited set of system calls. Specifically, vDSO is a relatively small optimization, but not a general solution for the problem of fine-grained low latency and high security execution of sensitive operations.

Another technique is to use extended Berkeley packet filter (EBPF) to inject safe code from user level (e.g., verified by a toolchain) into hook-points in a kernel so that custom in-the-flow actions in the kernel can be performed without requiring synchronous user-kernel interactions. EBPF is a technology that provides a sandboxed environment in which system administrators (admins) can load programs that run directly in the Linux OS kernel. EBPF is used primarily to run a small amount of verified code in a safe language inserted into kernel flow and potentially revectoring a code flow through timely steering directly into a user container. However, EBPF is not universally applicable for running a small amount kernel code in a user flow, especially for hot loops in user code.

Figure 2:
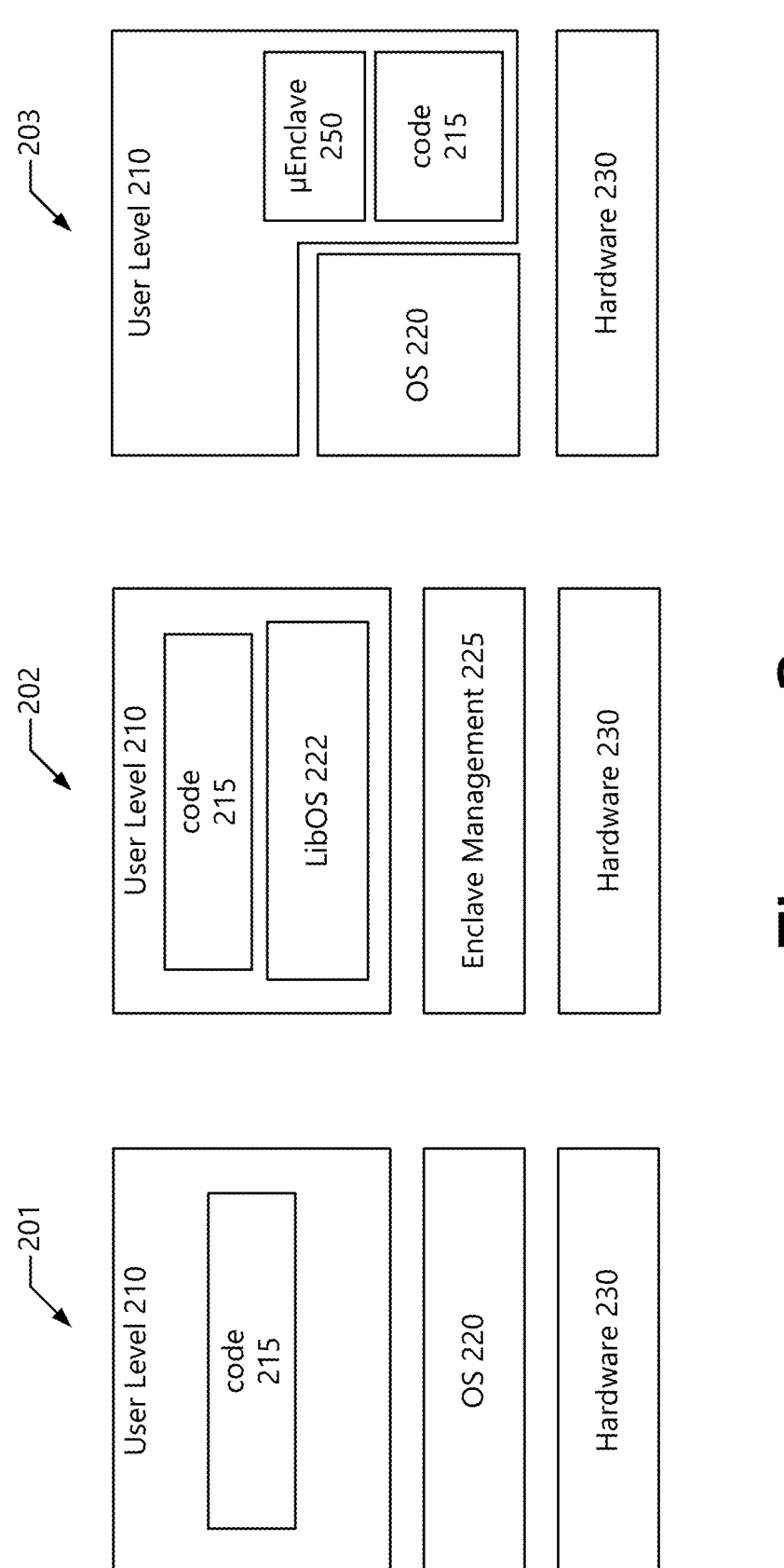
FIG. 2 depicts example platform architectures.

FIG. 2 shows various compute architectures including OS architecture 201, enclave architecture 202, and a micro-enclave (μenclave) architecture 203. Each of the platforms 201, 202, and 203 include system hardware (HW) 230 and a user level 210 that includes user level code 215. The OS architecture 201 includes an OS 220 (or privileged runtime 220), which may include one or more virtual machine manager (VMM) layers (not shown) that support(s) user level code 215 with any privileged operations in HW 230.

In enclave architecture 202, the HW 230 provides isolation mechanisms for user level code 215, and a libOS layer 222 also runs at user privilege to abstract HW details from application logic. The enclave management layer 225 manages enclave resources and thread execution during runtime (see e.g., Anderson, *The Case for Application-Specific Operating Systems*, PROCEEDINGS OF 3RD IEEE WORKSHOP ON WORKSTATION OPERATING SYSTEMS, pp. 92-94 (1992), Porter et al., *Rethinking the Library OS from the Top Down*, PROCEEDINGS OF THE SIXTEENTH INT'L CONFERENCE ON ARCHITECTURAL SUPPORT FOR PROGRAMMING LANGUAGES AND OPERATING SYSTEMS, pp. 291-304 (5 Mar. 2011), and Tazaki et al., *Library Operating System with Mainline Linux Network Stack*, PROCEEDINGS OF NETDEV 0.1, (February 2015), the contents of each of which are hereby incorporated by reference in their entireties). In some implementations, enclave architecture 202 may operate according to an enclave framework such as, for example, Intel® Software Guard Extensions (SGX), ARM® TrustZone® hardware security extensions, Keystone Enclaves provided by Oasis Labs™, Open Enclave SDK, and/or the like.

In the μenclave architecture 203, the majority of OS interactions may still occur via an OS 220, but a small number of highly frequent and relatively simple but stateful interactions with HW 230 are supported through a thin μenclave 250, which is discussed in more detailed infra. The μenclave architecture 203 allows time critical and relatively simple operations to be performed with a few instructions (e.g., sensitive code 110) and with highly deterministic latency. This is done by crossing over into those instructions (referred to herein as a "slice of instructions") through the μenclave 250. In the μenclave 250, these instructions are permitted to execute as if they were executed in the OS 220. However, these instructions are not allowed to call any functions outside of the μenclave 250 and can only call functions within the μenclave 250. That is, there is no transfer of control out of the μenclave 250 until the μenclave 250 is exited as a last instruction in the slice.

One distinction between a μenclave 250 entry and an OS 220 entry is that execution within a μenclave 250 continues on the normal stack of the application unless the code in the μenclave 250 implements a light-weight thread (e.g., a fiber, strand, task, and/or the like), unlike a stack switch that is typical for the OS arrangement 201. The μenclave 250 operations are library functions which are split off from a privileged OS/runtime. They contain a mix of stateful and stateless operations, including such steps as reading or writing various hardware registers or it) resource counters in operating system, ability to set up timers, ability to defer any preemption events by a small value within a threshold set by the operating system, and the like. These operations in a μenclave 250, even though performed at a user level privilege, are compiled by a separate compilation sequence and installed un-forgeably as static and unforgeable procedure collections which do not yield control to an OS scheduler. For doing that, an app can perform a yield in the normal or traditional manner. As discussed infra, code execution from a μenclave 250 can communicate through memory based shared state with other apps. and thus, enqueue or dequeue events and responses across address space boundaries without needing to do syscalls.

The ability to run a minimal amount of code securely, opaquely, and un-forgeably is powerful because many types of co-adaptation between user level 210 and HW 230 can now be done locally in user code 215 without the overhead incurred when performing a kernel call. For example, HW 230 prefetchers can be tuned, performance monitoring event and counter registers can be programmed to get precise assessments of cache or TLB or other hotspots, and user level code 215 can take algorithmic counter-measures in real time. Additionally, current and future persistent memory (pmem) devices and SmartNICs are making it possible for most interactions that were previously I/O based to be directly cache/memory based, and removing the need to cross over into the kernel can significantly reduce the software overhead when using these devices. Data Plane Development Kit (DPDK), Storage Performance Development Kit (SPDK), and Persistent Memory Development Kit (PMDK) provide some mechanisms to reduce overhead, but using these development kits require complicated software architectures, maintenance, and validation mechanisms.

FIG. 3 depicts an example 3a including a μenclave 300, which may correspond to the μenclave 250 of FIG. 2. The μenclave 300 includes a slice of code 301 (or a "slice 301"). The μenclave 300 comprises a bridge instruction 302 (BRIDGE) that can be in one of a set of modes. The bridge instruction 302 demarcates the boundaries between normal user level code 305 (which may be the same or similar as non-sensitive code 105 and/or user level code 215) and sensitive code 310. The user level code 305 and the sensitive code 310 may be executed by suitable execution units (e.g., arithmetic logic units (ALUs), floating point units (FPUs), load/store units, branch prediction units, single instruction multiple data (SIMD) units, and/or the like including the execution units discussed in [Intel64]) in a pipelined data-path of a suitable processor microarchitecture (μarch) such as μarch of the various processors discussed herein. Such μarchs may be modified according to the example implementations discussed herein.

In some implementations, the bridge instruction 302 includes two main modes including an enter mode (ENTER) and a leave mode (LEAVE). The bridge instruction 302 in the enter mode starts an instruction slice 301, and the bridge instruction 302 in the leave mode ends the instruction slice 301. In the example 3a, bridge instruction 302a is in the enter mode and bridge instruction 302b is in the leave mode. In some implementations, the execution of decoded instructions 310 takes place after execution of the bridge instruction 302a in the enter mode. Additionally or alternatively, the execution of decoded instructions 310 takes place in parallel with the execution of the bridge instruction 302a in the enter mode. The parallel execution of a bridge instruction 302a-b relative to other sensitive code 310 in the slice 301 may only be prevented based on dependencies that may exist among the operands. Particularly, if the instruction slice 301 is relatively thin (e.g., changing bits in an MSR to control prefetcher settings, or to read or update a kernel variable) then the bridge instruction 302a in the enter mode, the sensitive code 310, and bridge instruction 302b in the leave mode may all be executed in one shot. Given that all of the instructions are retired at the end of the slice 301, effectively the instructions can be reordered subject to actual operand dependencies between the instructions 310. In these implementations, an out-of-order execution engine can optimize the execution order for additional resource consumption efficiencies.

In addition to the two main modes (ENTER and LEAVE), there is a third mode of a bridge instruction 302, that is used less often than the other instructions. This third mode may be referred to as a connect mode (CONNECT), an example of which is shown by example 3b in FIG. 3. In example 3b, the μenclave 300a includes a slice 301a with sensitive code 310a and bridge instructions 302a and 302b, where slice 301a, sensitive code 310a, and bridge instructions 302a and 302b may be the same or similar to slice 301, sensitive code 310, and bridge instruction 302a, respectively, in example 3a. Additionally, example 3b includes μenclave 300b including slice 301b with sensitive code 310b and bridge instruction 302c (e.g., in the leave mode). In this example, the bridge instruction 302b is in the connect mode, which connects μenclave 300a to μenclave 300b. In other implementations, the bridge instruction 302b can overlap from μenclave 300a into μenclave 300b. The connect mode is a combined leave-and-enter mode, whose goal is to atomically leave one instruction slice 301a and enter an immediately next instruction slice 301b. In some implementations, slice 301b and/or μenclave 300b could include a bridge instruction in the enter mode (e.g., similar to slice 301a), which would immediately follow the connected mode bridge instruction 302b, but this would create a redundancy since a connected mode bridge instruction 302 followed by an enter mode bridge instruction 302 operates in the same manner as only including the connected mode bridge instruction 302. Additionally, if a connected mode bridge instruction 302 is immediately followed by a leave mode bridge instruction 302, the operation would be the same or similar as only including a leave mode bridge instruction 302. Furthermore, slice 301b and/or μenclave 300b can be preemptively set up before it is entered, for example, by pre-decoding instructions 310b and prefetching the decoded instructions 310b before entering μenclave 300b. Additional aspects of the operands and modes for the bridge instruction 302 and their interpretation are discussed infra.

1.1. Bridge Instruction in Enter Mode

Figure 4:
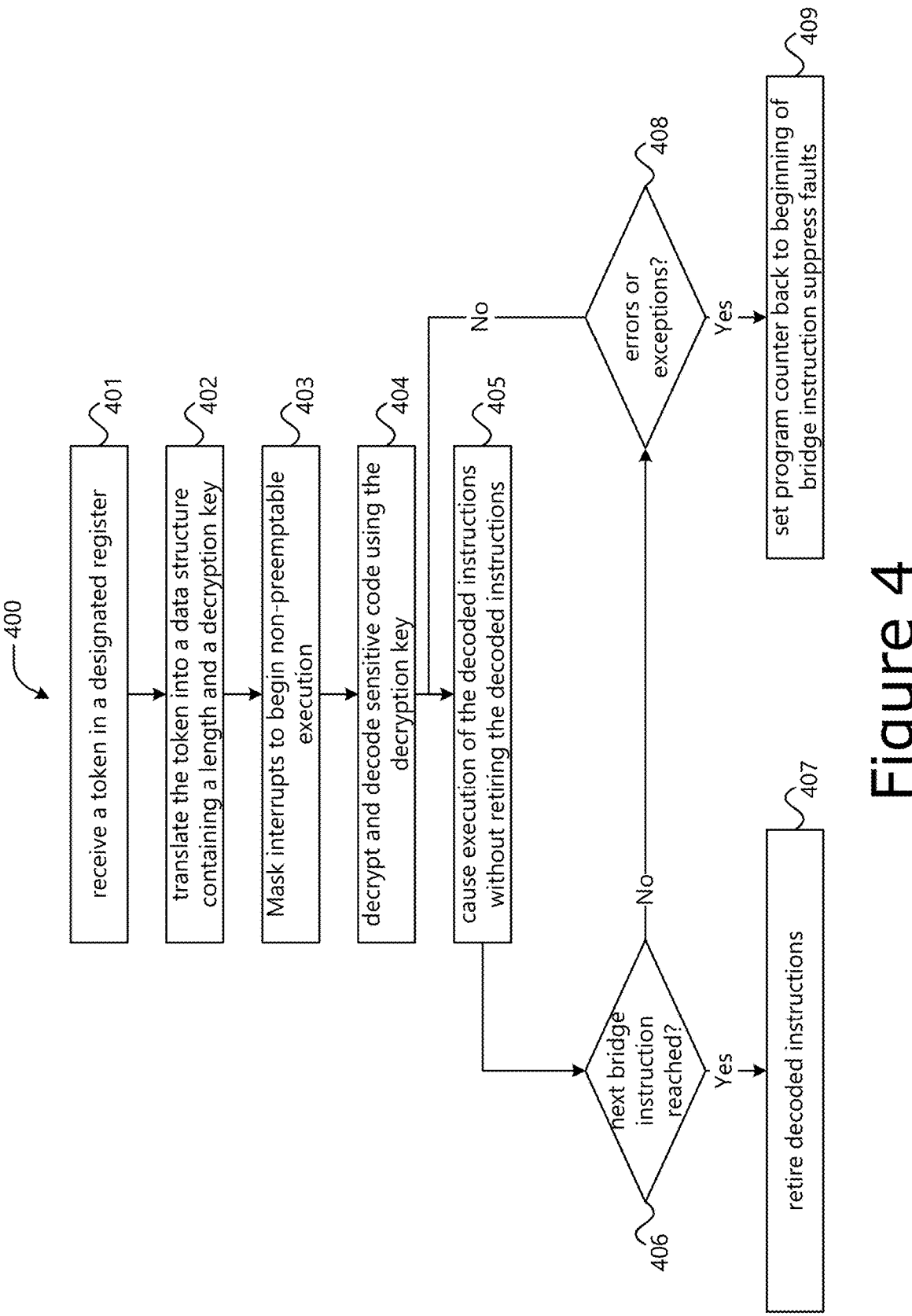
FIG. 4 depicts an example enter mode process

FIG. 4 shows an example enter mode process 400 for the operation of the bridge instruction 302 in the enter mode. Process 400 may be operated by one or more suitable execution units such as those discussed herein. Although FIG. 4 shows a particular order of operations for process 400, it should be noted that the depicted operations may be rearranged, combined, divided, and/or omitted in various ways in other implementations.

Process 400 begins at operation 401 where the bridge instruction 302 in the enter mode receives a token in a designated register. The token is an opaque bitfield to the application. At operation 402, the bridge instruction 302 in the enter mode translates the token to a structure containing a LENGTH and a decryption key. The LENGTH is an amount of data units (e.g., number of bytes) of an instruction slice 301 that is contained between itself and a next BRIDGE 302, which is either a LEAVE or a CONNECT. Additionally or alternatively, the LENGTH is a span of sensitive code 310 comprising instructions that takes up the LENGTH number of bytes.

At operation 403, the bridge instruction 302 in the enter mode masks interrupts to begin non-preemptable execution. At operation 404, the bridge instruction 302 in the enter mode uses the decryption key (e.g., from the translated token) to translate the sensitive code 310 and to decode the sensitive code 310 into scratchpad area.

At operation 406, the bridge instruction 302 in the enter mode executes or causes execution of the decoded instructions of the sensitive code 310, but does not retire any of the decoded instructions until the next bridge instruction 302 is reached. Some instructions in the decoded slice 301 are exceptions to this execute-but-do-not-retire rule, and those instructions are permitted to retire out of order without having reached the next bridge instruction 302.

At operation 406, the bridge instruction 302 in the enter mode determines whether the next bridge instruction 302 has been reached, and if so, the bridge instruction 302 in the enter mode proceeds to operation 407 to retire the decoded and executed instructions. If the next bridge instruction 302 has not been reached, the bridge instruction 302 in the enter mode proceeds to operation 408 to determine if any errors or exceptions have been thrown. These errors and/or exceptions can include, for example, page faults, a protection violation (e.g., "prot fault") or general-protection exception, and/or other like errors and/or exceptions such as those discussed in *Intel® 64 and IA-32 Architectures Software Developer's Manual*, combined vols. 1, 2A, 2B, 2C, 2D, 3A, 3B, 3C, 3D and 4, Order Number: 325462-076US (December 2021) ("[Intel64]"), the contents of which are hereby incorporated by reference in its entirety for all purposes.

If at operation 408 there are any errors or exceptions that occur in the execution of the instructions in the slice 301, then the bridge instruction 302 in the enter mode proceeds to operation 409 to set the program counter back to the beginning of the bridge instruction 302, and errors and/or exceptions (e.g., page/prot faults) are suppressed. Additionally or alternatively, a non-maskable signal is delivered to the application, which may or may not indicate the errors/exceptions. If that signal is not caught by the application, the application terminates. Additionally or alternatively, the address at which a page or protection fault occurred is conveyed to the application through the signal frame. Errors and/or exceptions in the instructions slices should be relatively rare, as programmers are expected to use bridged spans in their performance critical code. Unlike system calls, bridged sequences do not force a change of stack, but do not prevent it either, if the instruction slice 301 is implementing a user level thread (e.g., fiber library) environment or a co-routine environment. In some implementations, the bridge instruction 302 in the enter mode acts as a load fence, a store fence, or both, or neither, as specified in a sub-mode/flag/operand (see e.g., [Intel64]). In some implementations, if there is an error or exception at operation 408, process 400 can be repeated after the exception has been handled by the exception handler (e.g., which may be an application designated handler).

1.2. Bridge Instruction in Leave Mode

FIG. 5 shows an example leave mode process 500 for the operation of the bridge instruction 302 in the leave mode. Process 500 may be operated by one or more suitable execution units such as those discussed herein. Although FIG. 5 shows a particular order of operations for process 500, it should be noted that the depicted operations may be rearranged, combined, divided, and/or omitted in various ways in other implementations.

Process 500 begins at operation 501 where the bridge instruction 302 in the leave mode bulk retires all instructions not retired in a previous span (e.g., when the bridge instruction 302 was in the enter mode). At operation 502, the bridge instruction 302 in the leave mode unmasks interrupts (e.g., preemptable execution). At operation 503, the bridge instruction 302 in the leave mode implements a load fence, a store fence, or both as specified in a sub-mode/flag/operand or the like (see e.g., [Intel64]). In some implementations, operation 503 may be omitted.

Retiring the instructions may involve architecturally committing the instructions such that registers and cache (memory) changes become effective. Until retirement, the instructions are held up until the instruction(s) before it have retired in order of seniority. For example, a retirement unit (or reorder buffer (ROB)) in the microarchitecture instruction execution pipeline may receive the results of the executed micro-ops ("uops" or "μops") from an out-of-order execution core and processes the results so that the architectural state updates according to the original program order. When the μop completes and writes its result, it is retired. The retirement unit/ROB buffers completed μops, updates the architectural state in order, and manages the ordering of exceptions. The retirement section also keeps track of branches and sends updated branch target information to the branch target buffer (BTB). The BTB then purges pre-fetched traces that are no longer needed. In various implementations, individual instruction slices 301 effectively behaves like a single instruction (e.g., atomicity).

In some implementations, the sensitive spans 310 do not implement any type of a transactional synchronization extension (TSX) semantics. The reason for not retiring instructions until the end of a sensitive slice 301 is not to implement serializability among concurrent loads and stores to memory; this is done by standard mutual exclusion or ordering logic in the application's code. One reason for holding off retiring instructions until at the end of a slice 301 is to treat the slice 301 as a complex-instruction or a macro-instruction without having to deal with the complexity of what might happen if midway through a slice 301 some instruction runs into an error but some arbitrary collection of previous instructions in the slice have retired.

1.3. Bridge Instruction in Connect Mode

FIG. 6 shows an example connect mode process 600 for the operation of the bridge instruction 302 in the connect mode. Process 600 may be operated by one or more suitable execution units such as those discussed herein. Although FIG. 6 shows a particular order of operations for process 600, it should be noted that the depicted operations may be rearranged, combined, divided, and/or omitted in various ways in other implementations.

Process 600 begins at operation 601 where the bridge instruction 302 in the connect mode continues non-preemptable execution for a following instruction slice 301, without yet having retired the instructions completed from the previous slice 301. In some implementations, the bridge instruction 302 in the connect mode connects from one instruction slice 301 to another instruction slice 301, and checks if anything is pending before crossing over. At operation 602, the bridge instruction 302 in the connect mode performs the enter mode processes such as those discussed previously with respect to enter mode process 400 of FIG. 4. At operation 603, the bridge instruction 302 in the connect mode executes, but does not retire a first instruction from the next instruction slice 301. At operation 604, the bridge instruction 302 in the connect mode bulk retires all instructions not retired in the previous slice 301.

1.4. Inter-μEnclave Communication

Figure 7:
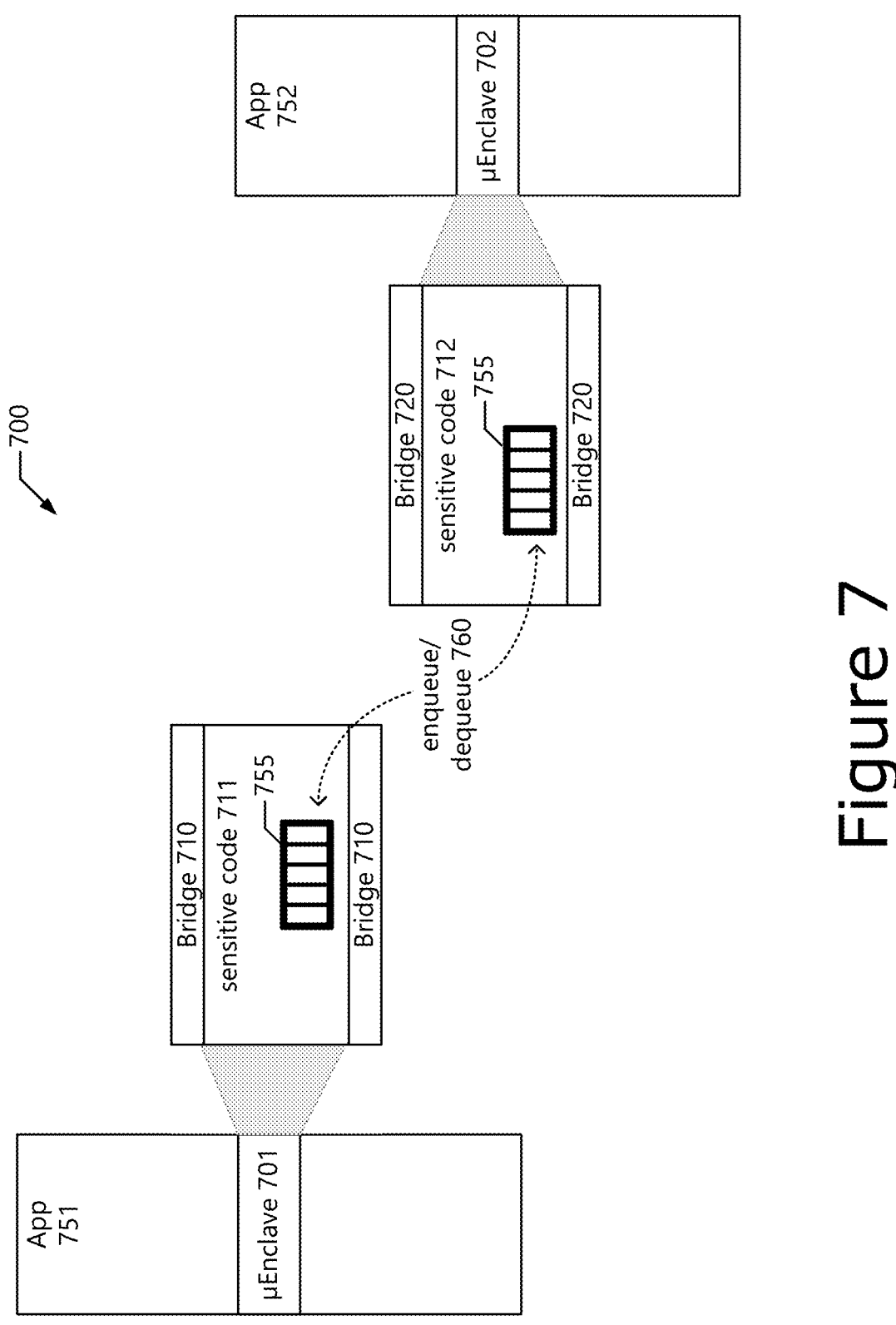
FIG. 7 depicts an example µenclave connector.

FIG. 7 shows an example of inter-μenclave communication 700. In this example, a first app 751 includes a μenclave 701 that includes sensitive code 711 between bridge instructions 710, and a second app 752 includes a μenclave 702 that includes sensitive code 712 between bridge instructions 720. The μenclave 701, 702 and bridge instructions 710, 720 may be the same or similar to the μenclave 300 and bridge instructions 302 of FIG. 3.

The bridged sensitive slices (e.g., μenclave 701, 702) can be used for inter-application active notifications concomitant to data communicated passively through shared memory. Here, two or more apps 751, 752 can use instructions slices protected by respective μenclaves 701, 702 in order to send and receive notifications through shared memory regions. While in theory the apps 751, 752 can communicate through shared memory without μenclaves 701, 702, the use of μenclaves 701, 702 makes it possible for these apps 751, 752 to acquire or release locks, semaphores, or otherwise control access to common resources including secure resources.

In one example, the μenclaves 701, 702 communicate with one another via a bi-directional queue 755 (or shared buffer 755), which is not looked up or otherwise accessed by the apps 751, 752. The shared buffer 755 may be located in a secured region of memory that is shared by, or accessible by the μenclaves 701, 702. In this example, the shared buffer 755 is used to provide hash keys for obtaining indexes to sensitive data, and the μenclaves 701, 702 perform lookup operations to obtain sensitive data or other data to be used for performing sensitive operations. For example, the first μenclave 701 may enqueue 760 a key to the queue 755, and the second μenclave 702 may dequeue 760 the key from the queue 755. During lookup, the second μenclave 702 may hash the key and the resulting hash indicates where the corresponding value is stored (e.g., the memory location or address). The hashed key may point to a memory location or address containing sensitive data and/or data used for performing sensitive operations. Additionally or alternatively, the memory location or address may be within in a memory (or memory area) shared by both apps 751 and 752, but decrypted only from their respective μenclaves 701 and 702. In this way, sensitive data does not need to be transferred between the μenclaves 701, 702.

In another example, protected execution can allow a producer of data, events, and the like to fill a circular buffer behind a tail pointer and ahead of a head pointer, while the consumer of the same can empty the buffer between the head pointer and the tail pointer concurrently. Without this mechanism in place, a common way for two apps 751, 752, to use shared memory for streaming events or data between one another is to implement mechanisms for calling event APIs, RPCs, or use some other means for allowing a thread in one address space to read or update a variable that is updated before, or read after, by another thread in a second address space. However, these mechanisms do not include proper boundary handling. One way that this can be prevented without the benefit of μenclaves is to have a common timestamp by which updates are marked in memory so that time becomes the common reference by which two communicating entities establish a consistent ordering among events. However, this mechanism is relatively cumbersome, since most modern processors can only do an atomic writes up to 8 bytes or 16 bytes. This means that applications have to update a high resolution time field within a data structure it can write atomically (e.g., scatter-gather is not atomic).

In another example, streaming from app 751 to app 752, any thread in one peer can enter the μenclaves 701, 702 on its side to react and/or respond to a notification that is pending. Thus, a combination of lockless polling outside the micro-enclave and synchronous (e.g., lock-synchronized) polling inside the μenclave can provide efficient streaming.

1.5. Caching of Executed Slices Using μEnclaves

Figure 8:
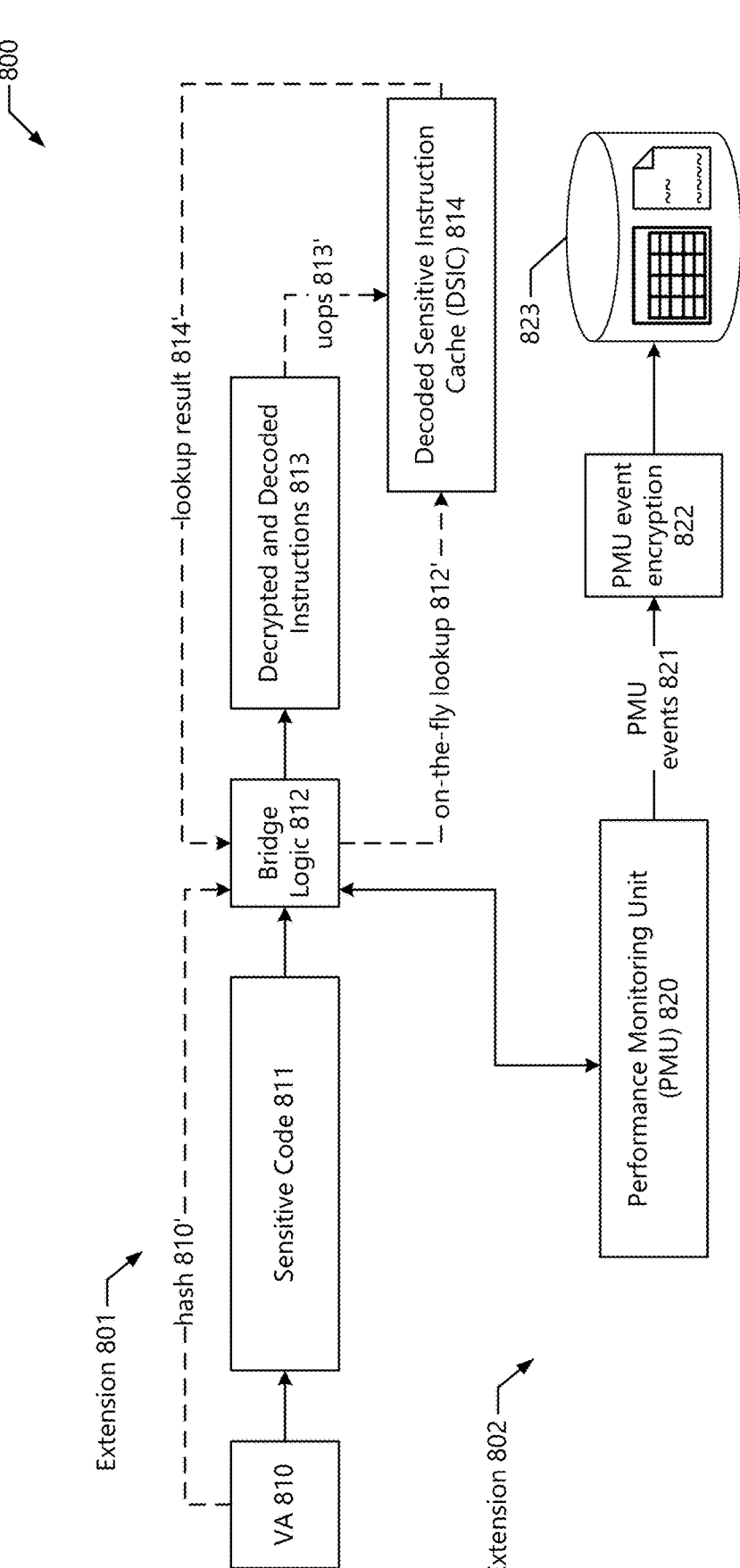
FIG. 8 depicts an example µenclave caching architecture.

FIG. 8 depicts an example μenclave caching architecture 800 (also referred to as "μenclave trace cache architecture 800" or the like. The bridge instruction 302 in the enter mode or in the connect mode can perform the caching technique of the μenclave caching architecture 800. The multi-step operations of the bridge instruction 302 in the enter mode (see e.g., section 1.1, supra) and the bridge instruction 302 in the connect mode (see e.g., section 1.3, supra) could be a source of overhead if those operations arise in the course of hot code paths and in repetitive loops. In particular, most of the overhead of these operations is overhead from performing decryption operations (e.g., at operations 402 and 404). In the μenclave caching architecture 800, extension 801 shows how caching can amortize out that overhead, and extension 802 provides for performance monitoring over the events in the μenclave, normally opaque to application code, in a manner that provides for performance optimization without breaking opaqueness.

Referring to extension 801, the virtual address (VA) 810 of the bridge instruction 302 in enter mode or connect mode starts an instruction slice (e.g., sensitive code 811). The VA 810 is used as a hash key 810' by the bridge logic 812 for a cache lookup 812' in the decoded sensitive instructions cache (DSIC) 814. The DSIC 814 is a caching element that stores previously decrypted and decoded instructions, and can be implemented as processor instruction cache (or a section of the CPU instruction cache), look-aside cache (e.g., level 1 (L1) and/or level 2 (L2) cache), translation lookaside buffers (TLBs), level 3 (L3) cache, level 4 (L4) cache, and/or some other short term cache or combinations thereof. The hash key 810' may be a secret hash 810' that is a function of the encryption key and is opaque to app SW. The cache lookup, in hardware, points to a location in the DSIC 814 if the slice 811 has been decrypted and decoded previously, and has been saved in the DSIC 814. The bridge logic 812 performs the on-the-fly cache lookup 812' in the DSIC 814, and the DSIC 814 provides a lookup result 814' to the bridge logic 812.

If the VA 810 and/or hash 810' is present in the DSIC 814 (e.g., as indicated by the lookup result 814'), then the decoded micro-ops ("uops" or "μops") are fed directly from the DSIC 814 into the logic 812 that implements the bridge instruction. If the VA 810 and/or hash 810' is not present in the DSIC 814 (e.g., as indicated by the lookup result 814'), then the bridge instruction, the LENGTH in bytes, and the decryption key are decoded out of the token (see e.g., section 1.1, supra). The indicated bytes are fetched, decrypted, and decoded 813 by the bridge logic 812 to produce the decoded uops 813' corresponding to the slice 811. The uops 813' are fed into the front-end of the pipeline just like any other set of uops, and the uops 813' are also saved in the DSIC 814, such that if a sensitive instruction is decoded once and stored in the DSIC 814, the next time it is fetched by the bridge logic 812, the CPU can eliminate the need to re-decode that instructions thereby saving time and power consumption.

Referring to extension 802, a performance monitoring unit (PMU) 820 monitors events such as, for example, L1 cache misses, L2 cache misses, numbers of clock cycles executed, branch mispredicts, loads, stores, and the like. The PMU 820 demarcates the collection of PMU events 821 (also referred to as "performance counts" or "performance counting events") separately from the collection of events related to execution of normal user code. The PMU events 821 are attributed to the bridge instruction's VA 810 for the purpose of code profiling. Additionally or alternatively, the PMU events 821 can be used for sensitive code within the μenclave and/or non-sensitive code that interacts with the μenclave. Raw events (counts) 821 are encrypted 822 with the μenclave key (e.g., the decryption key discussed in section 1.1) for storage in a secure data store 823. Additionally or alternatively, the PMU events 821 can be stored 823 in various forms or formats including, for example, as a dataset, in a database, in a table, in or as a data log, as data chunks, and/or any other suitable data structure. In these ways, the execution characteristics within the μenclave are made non-transparent to any entity other than that which is privy to the key, and thus, protects against attempts to decipher the μenclave's internals based on such event profiles.

In some implementations, the bridge logic 812 interacts with the PMU 820 to redirect the flow of the PMU events 821 according to whether the PMU events 821 are occurring while they're in sensitive code 811 or outside the sensitive code 811. In these implementations, the bridge logic 812 is only involved in redirecting the flow of PMU events 821 when the PMU events 821 are occurring in the sensitive code 811, and does not direct the flow of events that take place outside of the sensitive code 811. Additionally or alternatively, the PMU 820 receives signaling from the bridge logic 812 in order to in order to encrypt the PMU events 821 using a key that is opaque to the application SW.

In these implementations, the encrypted PMU events 821 can be logged with the unencrypted events, and an authorized application or service can access the encrypted PMU events 821 using a suitable decryption key.

2. Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, SDN, NFV, distributed RAN units and/or RAN clouds, and the like. Additional example use cases for edge computing include computational offloading, CDN services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 9 illustrates an example edge computing environment 900 including different layers of communication, starting from an endpoint layer 910*a* (also referred to as "sensor layer 910*a*", "things layer 910*a*", or the like) including one or more IoT devices 911 (also referred to as "endpoints 910*a*" or the like) (e.g., in an Internet of Things (IoT) network, wireless sensor network (WSN), fog, and/or mesh network topology); increasing in sophistication to intermediate layer 910*b* (also referred to as "client layer 910*b*", "gateway layer 910*b*", or the like) including various user equipment (UEs) 912*a*, 912*b*, and 912*c* (also referred to as "intermediate nodes 910*b*" or the like), which may facilitate the collection and processing of data from endpoints 910*a*; increasing in processing and connectivity sophistication to access layer 930 including a set of network access nodes (NANs) 931, 932, and 933 (collectively referred to as "NANs 930" or the like); increasing in processing and connectivity sophistication to edge layer 937 including a set of edge compute nodes 936*a-c* (collectively referred to as "edge compute nodes 936" or the like) within an edge computing framework 935 (also referred to as "ECT 935" or the like); and increasing in connectivity and processing sophistication to a backend layer 940 including core network (CN) 942, cloud 944, and server(s) 950. The processing at the backend layer 940 may be enhanced by network services as performed by one or more remote servers 950, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 900 is shown to include end-user devices such as intermediate nodes 910*b* and endpoint nodes 910*a* (collectively referred to as "nodes 910", "UEs 910", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 930, which are arranged to provide network connectivity to the UEs 910 via respective links 903*a* and/or 903*b* (collectively referred to as "channels 903", "links 903", "connections 903", and/or the like) between individual NANs 930 and respective UEs 910.

As examples, the communication networks and/or access technologies may include cellular technology such as LTE, MuLTEfire, and/or NR/5G (e.g., as provided by Radio Access Network (RAN) node 931 and/or RAN nodes 932), WiFi or wireless local area network (WLAN) technologies (e.g., as provided by access point (AP) 933 and/or RAN nodes 932), and/or the like. Different technologies exhibit benefits and limitations in different scenarios, and application performance in different scenarios becomes dependent on the choice of the access networks (e.g., WiFi, LTE, etc.) and the used network and transport protocols such as any of those discussed herein.

The intermediate nodes 910b include UE 912a, UE 912b, and UE 912c (collectively referred to as "UE 912" or "UEs 912"). In this example, the UE 912a is illustrated as a vehicle system (also referred to as a vehicle UE or vehicle station), UE 912b is illustrated as a smartphone (e.g., handheld touchscreen mobile computing device connectable to one or more cellular networks), and UE 912c is illustrated as a flying drone or unmanned aerial vehicle (UAV). However, the UEs 912 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, etc.), plug computers, and/or any type of computing device such as any of those discussed herein.

The endpoints 910 include UEs 911, which may be IoT devices (also referred to as "IoT devices 911"), which are uniquely identifiable embedded computing devices (e.g., within the Internet infrastructure) that comprise a network access layer designed for low-power IoT applications utilizing short-lived UE connections. The IoT devices 911 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 911 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 911 can utilize technologies such as M2M or MTC for exchanging data with an MTC server (e.g., a server 950), an edge server 936 and/or ECT 935, or device via a PLMN, ProSe or D2D communication, sensor networks, or IoT networks. The M2M or MTC exchange of data may be a machine-initiated exchange of data.

The IoT devices 911 may execute background applications (e.g., keep-alive messages, status updates, etc.) to facilitate the connections of the IoT network. Where the IoT devices 911 are, or are embedded in, sensor devices, the IoT network may be a WSN. An IoT network describes an interconnecting IoT UEs, such as the IoT devices 911 being connected to one another over respective direct links 905. The IoT devices may include any number of different types of devices, grouped in various combinations (referred to as an "IoT group") that may include IoT devices that provide one or more services for a particular user, customer, organizations, etc. A service provider (e.g., an owner/operator of server(s) 950, CN 942, and/or cloud 944) may deploy the IoT devices in the IoT group to a particular area (e.g., a geolocation, building, etc.) in order to provide the one or more services. In some implementations, the IoT network may be a mesh network of IoT devices 911, which may be termed a fog device, fog system, or fog, operating at the edge of the cloud 944. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 944 to Things (e.g., IoT devices 911). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 930) and/or a central cloud computing service (e.g., cloud 944) for performing heavy computations or computationally burdensome tasks. On the other hand, edge cloud computing consolidates human-operated, voluntary resources, as a cloud. These voluntary resource may include, inter-alia, intermediate nodes 920 and/or endpoints 910, desktop PCs, tablets, smartphones, nano data centers, and the like. In various implementations, resources in the edge cloud may be in one to two-hop proximity to the IoT devices 911, which may result in reducing overhead related to processing data and may reduce network delay.

Additionally or alternatively, the fog may be a consolidation of IoT devices 911 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 944. The fog operating at the edge of the cloud 944 may overlap or be subsumed into an edge network 930 of the cloud 944. The edge network of the cloud 944 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 936 or edge devices). The Fog layer resides on top of the edge layer and is a consolidation of networking devices such as the intermediate nodes 920 and/or endpoints 910 of FIG. 9.

Data may be captured, stored/recorded, and communicated among the IoT devices 911 or, for example, among the intermediate nodes 920 and/or endpoints 910 that have direct links 905 with one another as shown by FIG. 9. Analysis of the traffic flow and control schemes may be implemented by aggregators that are in communication with the IoT devices 911 and each other through a mesh network. The aggregators may be a type of IoT device 911 and/or network appliance. In the example of FIG. 9, the aggregators may be edge nodes 930, or one or more designated intermediate nodes 920 and/or endpoints 910. Data may be uploaded to the cloud 944 via the aggregator, and commands can be received from the cloud 944 through gateway devices that are in communication with the IoT devices 911 and the aggregators through the mesh network. Unlike the traditional cloud computing model, in some implementations, the cloud 944 may have little or no computational capabilities and only serves as a repository for archiving data recorded and processed by the fog. In these implementations, the cloud 944 centralized data storage system and provides reliability and access to data by the computing resources in the fog and/or edge devices. Being at the core of the architecture, the Data Store of the cloud 944 is accessible by both Edge and Fog layers of the aforementioned edge-fog network.

As mentioned previously, the access networks provide network connectivity to the end-user devices 920, 910 via respective NANs 930. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 931, 932. This virtualized framework allows the freed-up processor cores of the NANs 931, 932 to perform other virtualized applications, such as virtualized applications for various elements discussed herein.

The UEs 910 may utilize respective connections (or channels) 903*a*, each of which comprises a physical communications interface or layer. The connections 903*a* are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 910 and the NANs 930 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 910 and NANs 930 may operate using LAA, enhanced LAA (eLAA), and/or further eLAA (fe-LAA) mechanisms. The UEs 910 may further directly exchange communication data via respective direct links 905, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 910 provide radio information to one or more NANs 930 and/or one or more edge compute nodes 936 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 910 current location). As examples, the measurements collected by the UEs 910 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per chip to interference power density ratio (Ec/I0), energy per chip to noise power density ratio (Ec/N0), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI measurements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v16.2.0 (2021-03-31) ("[TS36214]"), 3GPP TS 38.215 v16.4.0 (2021-01-08) ("[TS38215]"), 3GPP TS 38.314 v16.4.0 (2021-09-30) ("[TS38314]"), *IEEE Standard for Information Technology—Telecommunications and Information Exchange between Systems—Local and Metropolitan Area Networks—Specific Requirements—Part* 11: *Wireless LAN Medium Access Control (MAC) and Physical Layer (PHY) Specifications, IEEE Std* 802.11-2020, pp. 1-4379 (26 Feb. 2021) ("[IEEE80211]"), and/or the like. Additionally or alternatively, any of the aforementioned measurements (or combination of measurements) may be collected by one or more NANs 930 and provided to the edge compute node(s) 936.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 910, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.3.1 (2021-06-24) ("[TS28552]"), 3GPP TS 32.425 v17.1.0 (2021-06-24) ("[TS32425]"), and/or the like.

The radio information may be reported in response to a trigger event and/or on a periodic basis. Additionally or alternatively, individual UEs 910 report radio information either at a low periodicity or a high periodicity depending on a data transfer that is to take place, and/or other information about the data transfer. Additionally or alternatively, the edge compute node(s) 936 may request the measurements from the NANs 930 at low or high periodicity, or the NANs 930 may provide the measurements to the edge compute node(s) 936 at low or high periodicity. Additionally or alternatively, the edge compute node(s) 936 may obtain other relevant data from other edge compute node(s) 936, core network functions (NFs), application functions (AFs), and/or other UEs 910 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned it) metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MAMS]), IEEE/WiFi (e.g., [IEEE802], [IEEE80211], [WiMAX], [IEEE16090], etc.), and/or any other like standards such as those discussed herein.

The UE 912*b* is shown as being capable of accessing access point (AP) 933 via a connection 903*b*. In this example, the AP 933 is shown to be connected to the Internet without connecting to the CN 942 of the wireless system. The connection 903*b* can include a local wireless connection, such as a connection consistent with any [IEEE802] protocol (e.g., [IEEE80211] and variants thereof), wherein the AP 933 would comprise a WiFi router. Additionally or alternatively, the UEs 910 can be configured to communicate using suitable communication signals with each other or with any of the AP 933 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 931 and 932 that enable the connections 903$a$ may be referred to as "RAN nodes" or the like. The RAN nodes 931, 932 may comprise ground stations (e.g., terrestrial access points) or satellite stations providing coverage within a geographic area (e.g., a cell). The RAN nodes 931, 932 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 931 is embodied as a NodeB, evolved NodeB (eNB), or a next generation NodeB (gNB), and the RAN nodes 932 are embodied as relay nodes, distributed units, or Road Side Unites (RSUs). Any other type of NANs can be used.

Any of the RAN nodes 931, 932 can terminate the air interface protocol and can be the first point of contact for the UEs 912 and IoT devices 911. Additionally or alternatively, any of the RAN nodes 931, 932 can fulfill various logical functions for the RAN including, but not limited to, RAN function(s) (e.g., radio network controller (RNC) functions and/or NG-RAN functions) for radio resource management, admission control, UL and DL dynamic resource allocation, radio bearer management, data packet scheduling, etc. Additionally or alternatively, the UEs 910 can be configured to communicate using OFDM communication signals with each other or with any of the NANs 931, 932 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RAN function(s) operated by the RAN or individual NANs 931-932 organize DL transmissions (e.g., from any of the RAN nodes 931, 932 to the UEs 910) and UL transmissions (e.g., from the UEs 910 to RAN nodes 931, 932) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 910 at each transmission time interval (TTI). A TTI is the duration of a transmission on a radio link 903$a$, 905, and is related to the size of the data blocks passed to the radio link layer from higher network layers.

The NANs 931, 932 may be configured to communicate with one another via respective interfaces or links (not shown), such as an X2 interface for LTE implementations (e.g., when CN 942 is an Evolved Packet Core (EPC)), an Xn interface for 5G or NR implementations (e.g., when CN 942 is an Fifth Generation Core (5GC)), or the like. The NANs 931 and 932 are also communicatively coupled to CN 942. Additionally or alternatively, the CN 942 may be an evolved packet core (EPC) network, a NextGen Packet Core (NPC) network, a 5G core (5GC), or some other type of CN. The CN 942 is a network of network elements and/or network functions (NFs) relating to a part of a communications network that is independent of the connection technology used by a terminal or user device. The CN 942 comprises a plurality of network elements/NFs configured to offer various data and telecommunications services to customers/subscribers (e.g., users of UEs 912 and IoT devices 911) who are connected to the CN 942 via a RAN. The components of the CN 942 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 942 may be referred to as a network slice, and a logical instantiation of a portion of the CN 942 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 942 components/functions.

The CN 942 is shown to be communicatively coupled to an application server 950 and a network 950 via an IP communications interface 955. the one or more server(s) 950 comprise one or more physical and/or virtualized systems for providing functionality (or services) to one or more clients (e.g., UEs 912 and IoT devices 911) over a network. The server(s) 950 may include various computer devices with rack computing architecture component(s), tower computing architecture component(s), blade computing architecture component(s), and/or the like. The server(s) 950 may represent a cluster of servers, a server farm, a cloud computing service, or other grouping or pool of servers, which may be located in one or more datacenters. The server(s) 950 may also be connected to, or otherwise associated with one or more data storage devices (not shown). Moreover, the server(s) 950 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 950 offer applications or services that use IP/network resources. As examples, the server(s) 950 may provide traffic management services, cloud analytics, content streaming services, immersive gaming experiences, social networking and/or microblogging services, and/or other like services. In addition, the various services provided by the server(s) 950 may include initiating and controlling software and/or firmware updates for applications or individual components implemented by the UEs 912 and IoT devices 911. The server(s) 950 can also be configured to support one or more communication services (e.g., Voice-over-Internet Protocol (VoIP) sessions, PTT sessions, group communication sessions, social networking services, etc.) for the UEs 912 and IoT devices 911 via the CN 942.

The Radio Access Technologies (RATs) employed by the NANs 930, the UEs 910, and the other elements in FIG. 9 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 930), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, *IEEE Guide for Wireless Access in Vehicular Environments (WAVE) Architecture*, IEEE STANDARDS ASSOCIATION, IEEE 1609.0-2019 (10 Apr. 2019) ("[IEEE16090]"), *V2X Communications Message Set Dictionary*, SAE INTL (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or *IEEE Standard for Air Interface for Broadband Wireless Access Systems, IEEE Std* 802.16-2017, pp. 1-2726 (2 Mar. 2018) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 944 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems (OS), virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 944 include application capabilities type, infrastructure capabilities type, and platform capabilities type. A cloud capabilities type is a classification of the functionality provided by a cloud service to a cloud service customer (e.g., a user of cloud 944), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 944 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service, which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 944 may represent one or more cloud servers, application servers, web servers, and/or some other remote infrastructure. The remote/cloud servers may include any one of a number of services and capabilities such as, for example, any of those discussed herein. Additionally or alternatively, the cloud 944 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 944 may be a network that comprises computers, network connections among the computers, and software routines to enable communication between the computers over network connections. In this regard, the cloud 944 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 944 may be via a wired or a wireless connection using the various communication protocols discussed infra. More than one network may be involved in a communication session between the illustrated devices. Connection to the cloud 944 may require that the computers execute software routines which enable, for example, the seven layers of the OSI model of computer networking or equivalent in a wireless (cellular) phone network. Cloud 944 may be used to enable relatively long-range communication such as, for example, between the one or more server(s) 950 and one or more UEs 910. Additionally or alternatively, the cloud 944 may represent the Internet, one or more cellular networks, local area networks, or wide area networks including proprietary and/or enterprise networks, TCP/Internet Protocol (IP)-based network, or combinations thereof. In these implementations, the cloud 944 may be associated with network operator who owns or controls equipment and other elements necessary to provide network-related services, such as one or more base stations or access points, one or more servers for routing digital data or telephone calls (e.g., a core network or backbone network), etc. The backbone links 955 may include any number of wired or wireless technologies, and may be part of a LAN, a WAN, or the Internet. In one example, the backbone links 955 are fiber backbone links that couple lower levels of service providers to the Internet, such as the CN 912 and cloud 944.

As shown by FIG. 9, each of the NANs 931, 932, and 933 are co-located with edge compute nodes (or "edge servers") 936a, 936b, and 936c, respectively. These implementations may be small-cell clouds (SCCs) where an edge compute node 936 is co-located with a small cell (e.g., pico-cell, femto-cell, etc.), or may be mobile micro clouds (MCCs) where an edge compute node 936 is co-located with a macro-cell (e.g., an eNB, gNB, etc.). The edge compute node 936 may be deployed in a multitude of arrangements other than as shown by FIG. 9. In a first example, multiple NANs 930 are co-located or otherwise communicatively coupled with one edge compute node 936. In a second example, the edge servers 936 may be co-located or operated by RNCs, which may be the case for legacy network deployments, such as 3G networks. In a third example, the edge servers 936 may be deployed at cell aggregation sites or at multi-RAT aggregation points that can be located either within an enterprise or used in public coverage areas. In a fourth example, the edge servers 936 may be deployed at the edge of CN 942. These implementations may be used in follow-me clouds (FMC), where cloud services running at distributed data centers follow the UEs 910 as they roam throughout the network. In any of the implementations discussed herein, the edge servers 936 provide a distributed computing environment for application and service hosting, and also provide storage and processing resources so that data and/or content can be processed in close proximity to subscribers (e.g., users of UEs 910) for faster response times The edge servers 936 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 936 from the UEs 910, CN 942, cloud 944, and/or server(s) 950, or vice versa. For example, a device application or client application operating in a UE 910 may offload application tasks or workloads to one or more edge servers 936. In another example, an edge server 936 may offload application tasks or workloads to one or more UE 910 (e.g., for distributed ML computation or the like).

The edge compute nodes 936 may include or be part of an edge system 935 that employs one or more ECTs 935. The edge compute nodes 936 may also be referred to as "edge hosts 936" or "edge servers 936." The edge system 935 includes a collection of edge servers 936 and edge management systems (not shown by FIG. 9) necessary to run edge computing applications within an operator network or a subset of an operator network. The edge servers 936 are physical computer systems that may include an edge platform and/or virtualization infrastructure, and provide compute, storage, and network resources to edge computing applications. Each of the edge servers 936 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 910. The VI of the edge servers 936 provide virtualized environments and virtualized resources for the edge hosts, and the edge computing applications may run as VMs and/or application containers on top of the VI.

In one example implementation, the ECT 935 is and/or operates according to the MEC framework, as discussed in ETSI GR MEC 001 v3.1.1 (2022-01), ETSI GS MEC 003 v3.1.1 (2022-03), ETSI GS MEC 009 v3.1.1 (2021-06), ETSI GS MEC 010-1 v1.1.1 (2017-10), ETSI GS MEC 010-2 v2.2.1 (2022-02), ETSI GS MEC 011 v2.2.1 (2020-12), ETSI GS MEC 012 V2.2.1 (2022-02), ETSI GS MEC 013 V2.2.1 (2022-01), ETSI GS MEC 014 v2.1.1 (2021-03), ETSI GS MEC 015 v2.1.1 (2020-06), ETSI GS MEC 016 v2.2.1 (2020-04), ETSI GS MEC 021 v2.2.1 (2022-02), ETSI GR MEC 024 v2.1.1 (2019-11), ETSI GS MEC 028 V2.2.1 (2021-07), ETSI GS MEC 029 v2.2.1 (2022-01), ETSI MEC GS 030 v2.1.1 (2020-04), ETSI GR MEC 031 v2.1.1 (2020-10), U.S. Provisional App. No. 63/003,834 filed Apr. 1, 2020 ("[US '834]"), and Int'l App. No. PCT/US2020/066969 filed on Dec. 23, 2020 ("[PCT '696]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021-03), ETSI GS NFV 002 V1.2.1 (2014-12), ETSI GR NFV 003 V1.6.1 (2021-03), ETSI GS NFV 006 V2.1.1 (2021-01), ETSI GS NFV-INF 001 V1.1.1 (2015-01), ETSI GS NFV-INF 003 V1.1.1 (2014-12), ETSI GS NFV-INF 004 V1.1.1 (2015-01), ETSI GS NFV-MAN 001 v1.1.1 (2014-12), and/or Israel et al., *OSM Release FIVE Technical Overview*, ETSI OPEN SOURCE MANO, OSM White Paper, 1st ed. (January 2019), https://osm.etsi.org/images/OSM-Whitepaper-TechContent-ReleaseFIVE-FINAL.pdf (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads// NG.127-v1.0-2.pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.1.0 (2021-12-23) ("[TS28533]"), the contents of each of which are hereby incorporated by reference in their entireties.

In another example implementation, the ECT 935 is and/or operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and interoperability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v05.00, O-RAN ALLIANCE WG1 (July 2021); *O-RAN Operations and Maintenance Architecture Specification* v04.00, O-RAN ALLIANCE WG1 (November 2020); *O-RAN Operations and Maintenance Interface Specification* v04.00, O-RAN ALLIANCE WG1 (November 2020); *O-RAN Information Model and Data Models Specification* v01.00, O-RAN ALLIANCE WG1 (November 2020); *O-RAN Working Group 1 Slicing Architecture* v05.00, O-RAN ALLIANCE WG1 (July 2021) ("[O-RAN.WG1. Slicing-Architecture]"); *O-RAN Working Group 2 (Non-RT RIC and A1 interface WG) A1 interface: Application Protocol* v03.01, O-RAN ALLIANCE WG2 (March 2021); *O-RAN Working Group 2 (Non-RT RIC and A1 interface WG) A1 interface: Type Definitions* v02.00, O-RAN ALLIANCE WG2 (July 2021); *O-RAN Working Group 2 (Non-RT RIC and A1 interface WG) A1 interface: Transport Protocol* v01.01, O-RAN ALLIANCE WG2 (March 2021); *O-RAN Working Group 2 AI/ML workflow description and requirements* v01.03 O-RAN ALLIANCE WG2 (July 2021); *O-RAN Working Group 2 Non-RT RIC: Functional Architecture* v01.03 O-RAN ALLIANCE WG2 (July 2021); *O-RAN Working Group 3, Near-Real-time Intelligent Controller, E2 Application Protocol (E2AP)* v02.00, O-RAN ALLIANCE WG3 (July 2021); *O-RAN Working Group 3 Near-Real-time Intelligent Controller Architecture & E2 General Aspects and Principles* v02.00, O-RAN ALLIANCE WG3 (July 2021); *O-RAN Working Group 3 Near-Real-time Intelligent Controller E2 Service Model (E2SM)* v02.00, O-RAN ALLIANCE WG3 (July 2021); *O-RAN Working Group 3 Near-Real-time Intelligent Controller E2 Service Model (E2SM) KPM* v02.00, O-RAN ALLIANCE WG3 (July 2021); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) RAN Control* v01.00, O-RAN ALLIANCE WG3 (July 2021); *O-RAN Working Group 3 Near-Real-time Intelligent Controller Near-RT RIC Architecture*

26 v02.00, O-RAN ALLIANCE WG3 (March 2021); *O-RAN Fronthaul Working Group 4 Cooperative Transport Interface Transport Control Plane Specification* v02.00, O-RAN ALLIANCE WG4 (March 2021); *O-RAN Fronthaul Working Group 4 Cooperative Transport Interface Transport Management Plane Specification* v02.00, O-RAN ALLIANCE WG4 (March 2021); *O-RAN Fronthaul Working Group 4 Control, User, and Synchronization Plane Specification* v07.00, O-RAN ALLIANCE WG4 (July 2021) ("[O-RAN.WG4.CUS]"); *O-RAN Fronthaul Working Group 4 Management Plane Specification* v07.00, O-RAN ALLIANCE WG4 (July 2021); *O-RAN Open F1/W1/E1/X2/Xn Interfaces Working Group Transport Specification* v01.00, O-RAN ALLIANCE WG5 (April 2020); *O-RAN Alliance Working Group 5 O1 Interface specification for O-DU* v02.00, O-RAN ALLIANCE WGX (July 2021); *Cloud Architecture and Deployment Scenarios for O-RAN Virtualized RAN* v02.02, O-RAN ALLIANCE WG6 (July 2021); *O-RAN Acceleration Abstraction Layer General Aspects and Principles* v01.01, O-RAN ALLIANCE WG6 (July 2021); *Cloud Platform Reference Designs* v02.00, O-RAN ALLIANCE WG6 (November 2020); *O-RAN O2 Interface General Aspects and Principles* v01.01, O-RAN ALLIANCE WG6 (July 2021); *O-RAN White Box Hardware Working Group Hardware Reference Design Specification for Indoor Pico Cell with Fronthaul Split Option 6* v02.00, O-RAN ALLIANCE WG7 (July 2021) ("[O-RAN.WG7.IPC-HRD-Opt6]"); *O-RAN WG7 Hardware Reference Design Specification for Indoor Picocell (FR1) with Split Option 7-2* v03.00, O-RAN ALLIANCE WG7 (July 2021) ("[O-RAN.WG7IPC-HRD-Opt7]"); *O-RAN WG7 Hardware Reference Design Specification for Indoor Picocell (FR1) with Split Option 8* v03.00, O-RAN ALLIANCE WG7 (July 2021) ("[O-RAN.WG7IPC-HRD-Opt8]"); *O-RAN Open Transport Working Group 9 Xhaul Packet Switched Architectures and Solutions* v02.00, O-RAN ALLIANCE WG9 (July 2021) ("[ORAN-WG9.XPAAS]"); *O-RAN Open X-haul Transport Working Group Management interfaces for Transport Network Elements* v02.00, O-RAN ALLIANCE WG9 (July 2021) ("[ORAN-WG9.XTRP-MGT]"); *O-RAN Open X-haul Transport WG9 WDM-based Fronthaul Transport* v01.00, O-RAN ALLIANCE WG9 (November 2020) ("[ORAN-WG9.WDM]"); *O-RAN Open X-haul Transport Working Group Synchronization Architecture and Solution Specification* v01.00, O-RAN ALLIANCE WG9 (March 2021) ("[ORAN-WG9.XTRP-SYN]"); *O-RAN Operations and Maintenance Interface Specification* v05.00, O-RAN ALLIANCE WG10 (July 2021); *O-RAN Operations and Maintenance Architecture* v05.00, O-RAN ALLIANCE WG10 (July 2021); *O-RAN: Towards an Open and Smart RAN*, O-RAN ALLIANCE, White Paper (October 2018), https://static1.squarespace.com/static/5ad774cce74940d7115044b0/t/5bc79b371905f4197055e8c6/1539808057078/O-RAN+WP+FInal+181017.pdf ("[ORANWP]"), and U.S. application Ser. No. 17/484,743 filed on 24 Sep. 2021 ("[US '743]") (collectively referred to as "[O-RAN]"); the contents of each of which are hereby incorporated by reference in their entireties.

In another example implementation, the ECT 935 is and/or operates according to the 3rd Generation Partnership Project (3GPP) System Aspects Working Group 6 (SA6) Architecture for enabling Edge Applications (referred to as "3GPP edge computing") as discussed in 3GPP TS 23.558 v17.2.0 (2021-12-31), 3GPP TS 23.501 v17.3.0 (2021-12-31), 3GPP TS 28.538 v0.4.0 (2021-12-08), and U.S. application Ser. No. 17/484,719 filed on 24 Sep. 2021 ("[US '719]") (collectively referred to as "[SA6Edge]"), the contents of each of which are hereby incorporated by reference in their entireties.

In another example implementation, the ECT 935 is and/or operates according to the Intel® Smart Edge Open framework (formerly known as OpenNESS) as discussed in Intel® Smart Edge Open Developer Guide, version 21.09 (30 Sep. 2021), available at: https://smart-edge-open.github.io/ ("[ISEO]"), the contents of which is hereby incorporated by reference in its entirety.

In another example implementation, the edge system 935 operates according to the Multi-Access Management Services (MAMS) framework as discussed in Kanugovi et al., *Multi-Access Management Services* (*MAMS*), INTERNET ENGINEERING TASK FORCE (IETF), Request for Comments (RFC) 8743 (March 2020) ("[RFC8743]"), Ford et al., *TCP Extensions for Multipath Operation with Multiple Addresses*, IETF RFC 8684, (March 2020), De Coninck et al., *Multipath Extensions for QUIC* (*MP-QUIC*), IETF DRAFT-DECONINCK-QUIC-MULTIPATH-07, IETA, QUIC Working Group (3 May 2021), Zhu et al., *User-Plane Protocols for Multiple Access Management Service*, IETF DRAFT-ZHU-INTAREA-MAMS-USER-PROTOCOL-09, IETA, INTAREA (4 Mar. 2020), and Zhu et al., *Generic Multi-Access* (*GMA*) *Convergence Encapsulation Protocols*, IETF DRAFT-ZHU-INTAREA-GMA-14, IETA, INTAREA/Network Working Group (24 Nov. 2021) (collectively referred to as "[MAMS]"), the contents of each of which are hereby incorporated by reference in their entireties. In these implementations, an edge compute node 935 and/or one or more cloud computing nodes/clusters may be one or more MAMS servers that includes or operates a Network Connection Manager (NCM) for downstream/DL traffic, and the individual UEs 910 include or operate a Client Connection Manager (CCM) for upstream/UL traffic. An NCM is a functional entity that handles MAMS control messages from clients (e.g., individual UEs 910 configures the distribution of data packets over available access paths and (core) network paths, and manages user-plane treatment (e.g., tunneling, encryption, and/or the like) of the traffic flows. The CCM is the peer functional element in a client (e.g., individual UEs 910 that handles MAMS control-plane procedures, exchanges MAMS signaling messages with the NCM, and configures the network paths at the client for the transport of user data.

It should be understood that the aforementioned edge computing frameworks/ECTs and services deployment examples are only illustrative examples of ECTs, and that the present disclosure may be applicable to many other or additional edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

FIG. 10 illustrates an example software distribution platform 1005 to distribute software 1060, such as the example computer readable instructions 1160 of FIG. 11, to one or more devices, such as example processor platform(s) 1000 and/or example connected edge devices 1162 (see e.g., FIG. 11) and/or any of the other computing systems/devices discussed herein. The example software distribution platform 1005 may be implemented by any computer server, data facility, cloud service, etc., capable of storing and transmitting software to other computing devices (e.g., third parties, the example connected edge devices 1162 of FIG.

11). Example connected edge devices may be customers, clients, managing devices (e.g., servers), third parties (e.g., customers of an entity owning and/or operating the software distribution platform 1005). Example connected edge devices may operate in commercial and/or home automation environments. In some examples, a third party is a developer, a seller, and/or a licensor of software such as the example computer readable instructions 1160 of FIG. 11. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 10, the software distribution platform 1005 includes one or more servers and one or more storage devices. The storage devices store the computer readable instructions 1060, which may correspond to the example computer readable instructions 1160 of FIG. 11, as described above. The one or more servers of the example software distribution platform 1005 are in communication with a network 1010, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1060 from the software distribution platform 1005. For example, the software 1060, which may correspond to the example computer readable instructions 1160 of FIG. 11, may be downloaded to the example processor platform(s) 1000, which is/are to execute the computer readable instructions 1060 to implement Radio apps.

In some examples, one or more servers of the software distribution platform 1005 are communicatively connected to one or more security domains and/or security devices through which requests and transmissions of the example computer readable instructions 1060 must pass. In some examples, one or more servers of the software distribution platform 1005 periodically offer, transmit, and/or force updates to the software (e.g., the example computer readable instructions 1160 of FIG. 11) to ensure improvements, patches, updates, etc. are distributed and applied to the software at the end user devices.

In the illustrated example of FIG. 10, the computer readable instructions 1060 are stored on storage devices of the software distribution platform 1005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 1181, 1182, 1183 stored in the software distribution platform 1005 are in a first format when transmitted to the example processor platform(s) 1000. In some examples, the first format is an executable binary in which particular types of the processor platform(s) 1000 can execute. However, in some examples, the first format is uncompiled code that requires one or more preparation tasks to transform the first format to a second format to enable execution on the example processor platform(s) 1000. For instance, the receiving processor platform(s) 1000 may need to compile the computer readable instructions 1060 in the first format to generate executable code in a second format that is capable of being executed on the processor platform(s) 1000. In still other examples, the first format is interpreted code that, upon reaching the processor platform(s) 1000, is interpreted by an interpreter to facilitate execution of instructions.

FIG. 11 illustrates an example of components that may be present in an compute node 1150 for implementing the techniques (e.g., operations, processes, methods, and methodologies) described herein. This compute node 1150 provides a closer view of the respective components of node 1150 when implemented as or as part of a computing device (e.g., as a mobile device, a base station, server, gateway, etc.). The compute node 1150 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the compute node 1150, or as components otherwise incorporated within a chassis of a larger system.

The compute node 1150 includes processing circuitry in the form of one or more processors 1152. The processor circuitry 1152 includes circuitry such as, for example, one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1152 may include one or more hardware accelerators (e.g., same or similar to acceleration circuitry 1164), which may be microprocessors, programmable processing devices (e.g., FPGA, ASIC, etc.), or the like. The one or more accelerators may include, for example, computer vision and/or deep learning accelerators. In some implementations, the processor circuitry 1152 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1152 may be, for example, one or more processor cores (CPUs), application processors, graphics processing units (GPUs), RISC processors, Acorn RISC Machine (ARM) processors, CISC processors, one or more DSPs, FPGAs, PLDs, one or more ASICs, baseband processors, radio-frequency integrated circuits (RFIC), microprocessors or controllers, multi-core processor, multithreaded processor, ultra-low voltage processor, embedded processor, a specialized x-processing unit (xPU) or a data processing unit (DPU) (e.g., Infrastructure Processing Unit (IPU), network processing unit (NPU), and the like), and/or any other known processing elements, or any suitable combination thereof. In various implementations, the processor circuitry 1152 includes a μarch that is capable of executing the μenclave implementations and techniques discussed herein. The processors (or cores) 1152 may be coupled with or may include memory/storage and may be configured to execute instructions stored in the memory/storage to enable various applications or OSs to run on the platform 1150. The processors (or cores) 1152 is configured to operate application software to provide a specific service to a user of the platform 1150. Additionally or alternatively, the processor(s) 1152 may be a special-purpose processor(s)/controller(s) configured (or configurable) to operate according to the elements, features, and implementations discussed herein.

As examples, the processor(s) 1152 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1152 may be a part of a system on a chip (SoC), System-in-Package (SiP), a multi-chip package (MCP), and/or the like, in which the processor(s) 1152 and other components are formed into a single integrated circuit, or a single package, such as the Edison™ or Galileo™ SoC boards from Intel® Corporation. Other examples of the processor(s) 1152 are mentioned elsewhere in the present disclosure.

The processor(s) 1152 may communicate with system memory 1154 over an interconnect (IX) 1156. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Additionally or alternatively, the memory circuitry 1154 is or includes block addressable memory device(s), such as those based on NAND or NOR technologies (e.g., Single-Level Cell ("SLC"), Multi-Level Cell ("MLC"), Quad-Level Cell ("QLC"), Tri-Level Cell ("TLC"), or some other NAND).

To provide for persistent storage of information such as data, applications, OSs and so forth, a storage 1158 may also couple to the processor 1152 via the IX 1156. In an example, the storage 1158 may be implemented via a solid-state disk drive (SSDD) and/or high-speed electrically erasable memory (commonly referred to as "flash memory"). Other devices that may be used for the storage 1158 include flash memory cards, such as SD cards, microSD cards, eXtreme Digital (XD) picture cards, and the like, and USB flash drives. Additionally or alternatively, the memory circuitry 1154 and/or storage circuitry 1158 may be or may include memory devices that use chalcogenide glass, multi-threshold level NAND flash memory, NOR flash memory, single or multi-level Phase Change Memory (PCM) and/or phase change memory with a switch (PCMS), NVM devices that use chalcogenide phase change material (e.g., chalcogenide glass), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. Additionally or alternatively, the memory circuitry 1154 and/or storage circuitry 1158 can include resistor-based and/or transistor-less memory architectures. The memory circuitry 1154 and/or storage circuitry 1158 may also incorporate three-dimensional (3D) cross-point (XPOINT) memory devices (e.g., Intel® 3D XPoint™ memory), and/or other byte addressable write-in-place NVM. The memory circuitry 1154 and/or storage circuitry 1158 may refer to the die itself and/or to a packaged memory product.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

Computer program code for carrying out operations of the present disclosure (e.g., computational logic and/or instructions 1181, 1182, 1183) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1181, 1182, 1183 for carrying out operations of the present disclosure may also be written in any combination of the programming languages discussed herein. The program code may execute entirely on the system 1150, partly on the system 1150, as a stand-alone software package, partly on the system 1150 and partly on a remote computer or entirely on the remote computer or server. In the latter scenario, the remote computer may be connected to the system 1150 through any type of network, including a LAN or WAN, or the connection may be made to an external computer (e.g., through the Internet using an Internet Service Provider (ISP)).

In an example, the instructions 1181, 1182, 1183 on the processor circuitry 1152 (separately, or in combination with the instructions 1181, 1182, 1183) may configure execution or operation of a trusted execution environment (TEE) 1190. The TEE 1190 operates as a protected area accessible to the processor circuitry 1102 to enable secure access to data and secure execution of instructions. In some embodiments, the TEE 1190 may be a physical hardware device that is separate from other components of the system 1150 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1190 may be implemented as secure enclaves (or "enclaves"), which are isolated regions of code and/or data within the processor and/or memory/storage circuitry of the compute node 1150. Only code executed within a secure enclave may access data within the same secure enclave, and the secure enclave may only be accessible using the secure application (which may be implemented by an application processor or a tamper-resistant microcontroller). Various implementations of the TEE 1190, and an accompanying secure area in the processor circuitry 1152 or the memory circuitry 1154 and/or storage circuitry 1158 may be provided, for instance, through use of Intel® Software Guard Extensions (SGX), ARM® TrustZone®, Keystone Enclaves, Open Enclave SDK, and/or the like. Other aspects of security hardening, hardware roots-of-trust, and trusted or protected operations may be implemented in the device 1100 through the TEE 1190 and the processor circuitry 1152. Additionally or alternatively, the memory circuitry 1154 and/or storage circuitry 1158 may be divided into isolated user-space instances such as virtualization/OS containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1104 and/or storage circuitry 1108 may be divided into one or more trusted memory regions for storing applications or software modules of the TEE 1190.

The OS stored by the memory circuitry 1154 and/or storage circuitry 1158 is software to control the compute node 1150. The OS may include one or more drivers that operate to control particular devices that are embedded in the compute node 1150, attached to the compute node 1150, and/or otherwise communicatively coupled with the compute node 1150. Example OSs include consumer-based operating systems (e.g., Microsoft® Windows® 10, Google® Android®, Apple® macOS®, Apple® iOS®, KaiOS™ provided by KaiOS Technologies Inc., Unix or a Unix-like OS such as Linux, Ubuntu, or the like), industry-focused OSs such as real-time OS (RTOS) (e.g., Apache® Mynewt, Windows® IoT®, Android Things®, Micrium® Micro-Controller OSs ("MicroC/OS" or "µC/OS"), VxWorks®, FreeRTOS, and/or the like), hypervisors (e.g., Xen® Hypervisor, Real-Time Systems® RTS Hypervisor, Wind River Hypervisor, VMWare® vSphere® Hypervisor, and/or the like), and/or the like. The OS can invoke alternate software to facilitate one or more functions and/or operations that are not native to the OS, such as particular communication protocols and/or interpreters. Additionally or alternatively, the OS instantiates various functionalities that are not native to the OS. In some examples, OSs include varying degrees of complexity and/or capabilities. In some examples, a first OS on a first compute node 1150 may be the same or different than a second OS on a second compute node 1150. For instance, the first OS may be an RTOS having particular performance expectations of responsivity to dynamic input conditions, and the second OS can include GUI capabilities to facilitate end-user I/O and the like.

The storage 1158 may include instructions 1183 in the form of software, firmware, or hardware commands to implement the techniques described herein. Although such instructions 1183 are shown as code blocks included in the memory 1154 and the storage 1158, any of the code blocks may be replaced with hardwired circuits, for example, built into an application specific integrated circuit (ASIC), FPGA memory blocks, and/or the like. In an example, the instructions 1181, 1182, 1183 provided via the memory 1154, the storage 1158, or the processor 1152 may be embodied as a non-transitory, machine-readable medium 1160 including code to direct the processor 1152 to perform electronic operations in the compute node 1150. The processor 1152 may access the non-transitory, machine-readable medium 1160 (also referred to as "computer readable medium 1160" or "CRM 1160") over the IX 1156. For instance, the non-transitory, CRM 1160 may be embodied by devices described for the storage 1158 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, CRM 1160 may include instructions to direct the processor 1152 to perform a specific sequence or flow of actions, for example, as described with respect to the flowchart(s) and/or block diagram(s) of operations and functionality depicted herein.

The components of edge computing device 1150 may communicate over an interconnect (IX) 1156. The IX 1156 may include any number of technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX, RapidIO™ IX, Coherent Accelerator Processor Interface (CAPI), OpenCAPI, Advanced Microcontroller Bus Architecture (AMBA) IX, cache coherent interconnect for accelerators (CCIX), Gen-Z Consortium IXs, a HyperTransport IX, NVLink provided by NVIDIA®, ARM Advanced eXtensible Interface (AXI), a Time-Trigger Protocol (TTP) system, a FlexRay system, PROFIBUS, Ethernet, USB, On-Chip System Fabric (IOSF), Infinity Fabric (IF), and/or any number of other IX technologies. The IX 1156 may be a proprietary bus, for example, used in a SoC based system.

The IX 1156 couples the processor 1152 to communication circuitry 1166 for communications with other devices, such as a remote server (not shown) and/or the connected edge devices 1162. The communication circuitry 1166 is a hardware element, or collection of hardware elements, used to communicate over one or more networks (e.g., cloud 1163) and/or with other devices (e.g., edge devices 1162). Communication circuitry 1166 includes modem circuitry 1166x may interface with application circuitry of system 800 (e.g., a combination of processor circuitry 802 and CRM 860) for generation and processing of baseband signals and for controlling operations of the TRx 812. The modem circuitry 1166x may handle various radio control functions that enable communication with one or more (R)ANs via the transceivers (TRx) 1166y and 1166z according to one or more wireless communication protocols and/or RATs. The modem circuitry 1166x may include circuitry such as, but not limited to, one or more single-core or multi-core processors (e.g., one or more baseband processors) or control logic to process baseband signals received from a receive signal path of the TRxs 1166y, 1166z, and to generate baseband signals to be provided to the TRxs 1166y, 1166z via a transmit signal path. The modem circuitry 1166x may implement a real-time OS (RTOS) to manage resources of the modem circuitry 1166x, schedule tasks, perform the various radio control functions, process the transmit/receive signal paths, and the like. In some implementations, the modem circuitry 1166x includes a µarch that is capable of executing the µenclave implementations and techniques discussed herein.

The TRx 1166y may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with a [IEEE802] standard (e.g., [IEEE80211] and/or the like). In addition, wireless wide area communications, e.g., according to a cellular or other wireless wide area protocol, may occur via a wireless wide area network (WWAN) unit.

The TRx 1166$y$ (or multiple transceivers 1166$y$) may communicate using multiple standards or radios for communications at a different range. For example, the compute node 1150 may communicate with relatively close devices (e.g., within about 10 meters) using a local transceiver based on BLE, or another low power radio, to save power. More distant connected edge devices 1162 (e.g., within about 50 meters) may be reached over ZigBee® or other intermediate power radios. Both communications techniques may take place over a single radio at different power levels or may take place over separate transceivers, for example, a local transceiver using BLE and a separate mesh transceiver using ZigBee®.

A TRx 1166$z$ (e.g., a radio transceiver) may be included to communicate with devices or services in the edge cloud 1163 via local or wide area network protocols. The TRx 1166$z$ may be an LPWA transceiver that follows [IEEE802154] or IEEE 802.15.4g standards, among others. The edge computing node 1163 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used. Any number of other radio communications and protocols may be used in addition to the systems mentioned for the TRx 1166$z$, as described herein. For example, the TRx 1166$z$ may include a cellular transceiver that uses spread spectrum (SPA/SAS) communications for implementing high-speed communications. Further, any number of other protocols may be used, such as WiFi® networks for medium speed communications and provision of network communications. The TRx 1166$z$ may include radios that are compatible with any number of 3GPP specifications, such as LTE and 5G/NR communication systems.

A network interface controller (NIC) 1168 may be included to provide a wired communication to nodes of the edge cloud 1163 or to other devices, such as the connected edge devices 1162 (e.g., operating in a mesh, fog, and/or the like). The wired communication may provide an Ethernet connection (ses e.g., Ethernet (e.g., IEEE Standard for Ethernet, IEEE Std 802.3-2018, pp. 1-5600 (31 Aug. 2018) ("[IEEE8023]")) or may be based on other types of networks, such as Controller Area Network (CAN), Local Interconnect Network (LIN), DeviceNet, ControlNet, Data Highway+, or PROFINET, a SmartNIC, Intelligent Fabric Processor(s) (IFP(s)), among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The compute node 1150 may include or be coupled to acceleration circuitry 1164, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. Additionally or alternatively, the acceleration circuitry 1164 may include xPUs and/or DPUs, IPUs, NPUs, and/or the like. These tasks may include AI/ML tasks (e.g., training, inferencing/prediction, classification, and the like), visual data processing, network data processing, infrastructure function management, object detection, rule analysis, or the like. In FPGA-based implementations, the acceleration circuitry 1164 may comprise logic blocks or logic fabric and other interconnected resources that may be programmed (configured) to perform various functions, such as the procedures, methods, functions, etc. discussed herein. In such implementations, the acceleration circuitry 1164 may also include memory cells (e.g., EPROM, EEPROM, flash memory, static memory (e.g., SRAM, anti-fuses, etc.) used to store logic blocks, logic fabric, data, etc. in LUTs and the like. In some implementations, the modem circuitry 1166$x$ includes a μarch that is capable of executing the μenclave implementations and techniques discussed herein.

The IX 1156 also couples the processor 1152 to a sensor hub or external interface 1170 that is used to connect additional devices or subsystems. The additional/external devices may include sensors 1172, actuators 1174, and positioning circuitry 1145.

The sensor circuitry 1172 includes devices, modules, or subsystems whose purpose is to detect events or changes in its environment and send the information (sensor data) about the detected events to some other a device, module, subsystem, etc. Examples of such sensors 1172 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1150); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1174, allow platform 1150 to change its state, position, and/or orientation, or move or control a mechanism or system. The actuators 1174 comprise electrical and/or mechanical devices for moving or controlling a mechanism or system, and converts energy (e.g., electric current or moving air and/or liquid) into some kind of motion. The actuators 1174 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1174 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1150 may be configured to operate one or more actuators 1174 based on one or more captured events and/or instructions or control signals received from a service provider and/or various client systems.

The positioning circuitry 1145 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1145 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1145 may include a Micro-Technology for Positioning, Navigation, and Timing (Micro-PNT) IC that uses a master timing clock to perform position tracking/estimation without GNSS assistance. The positioning circuitry 1145 may also be part of, or interact with, the communication circuitry 1166 to communicate with the nodes and components of the positioning network. The positioning circuitry 1145 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1145 is, or includes an INS, which is a system or device that uses sensor circuitry 1172 (e.g., motion sensors such as accelerometers, rotation sensors such as gyroscopes, and altimeters, magentic sensors, and/or the like to continuously calculate (e.g., using dead by dead reckoning, triangulation, or the like) a position, orientation, and/or velocity (including direction and speed of movement) of the platform 1150 without the need for external references.

In some optional examples, various input/output (I/O) devices may be present within or connected to, the compute node 1150, which are referred to as input circuitry 1186 and output circuitry 1184 in FIG. 11. The input circuitry 1186 and output circuitry 1184 include one or more user interfaces designed to enable user interaction with the platform 1150 and/or peripheral component interfaces designed to enable peripheral component interaction with the platform 1150. Input circuitry 1186 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1184 may be included to show information or otherwise convey information, such as sensor readings, actuator position(s), or other like information. Data and/or graphics may be displayed on one or more user interface components of the output circuitry 1184. Output circuitry 1184 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1150. The output circuitry 1184 may also include speakers or other audio emitting devices, printer(s), and/or the like. Additionally or alternatively, the sensor circuitry 1172 may be used as the input circuitry 1184 (e.g., an image capture device, motion capture device, or the like) and one or more actuators 1174 may be used as the output device circuitry 1184 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the compute node 1150, although, in examples in which the compute node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the compute node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the IX 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the compute node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the compute node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The example of FIG. 11 is intended to depict a high-level view of components of a varying device, subsystem, or arrangement of an edge computing node. However, in other implementations, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

3. Examples

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method of providing a micro-enclave (μenclave), the method comprising: during execution of user level code of an application, executing a first bridge instruction indicating entry into the μenclave; executing sensitive code within the μenclave after execution of the first bridge instruction; executing a second bridge instruction to exit the μenclave; and resuming execution of the user level code after execution of the second bridge instruction.

Example 2 includes the method of example 1 and/or some other example(s) herein, wherein the first bridge instruction is a bridge instruction in an enter mode, and the method includes: receiving a token in a designated register; translating the token into a decryption key; and decoding instructions of the sensitive code using the decryption key.

Example 3 includes the method of example 2 and/or some other example(s) herein, wherein the method includes: translating the token into a length and the decryption key, wherein the length is a number of data units of the sensitive code between the first bridge instruction and the second bridge instruction.

Example 4 includes the method of example 3 and/or some other example(s) herein, wherein the number of data units of the length includes the sensitive code between the first bridge instruction and the second bridge instruction and including a number of data units of the first bridge instruction and the second bridge instruction.

Example 5 includes the method of examples 2-4 and/or some other example(s) herein, wherein the decoding includes: decoding the sensitive code into a scratchpad memory.

Example 6 includes the method of examples 2-5 and/or some other example(s) herein, wherein the executing the sensitive code includes: executing the decoded instructions without retiring any of the instructions until the second bridge instruction is reached.

Example 7 includes the method of examples 2-6 and/or some other example(s) herein, wherein the executing the sensitive code includes: setting a program counter back to a beginning of the first bridge instruction when an exception occurs during execution of the sensitive code.

Example 8 includes the method of example 7 and/or some other example(s) herein, wherein the executing the sensitive code includes: suppressing the exception; and delivering a signal frame to the application, wherein the signal frame includes the exception that occurred during execution of the sensitive code.

Example 9 includes the method of example 8 and/or some other example(s) herein, wherein the executing the sensitive code includes: terminating execution of the sensitive code when the application does not receive the signal frame.

Example 10 includes the method of examples 2-9 and/or some other example(s) herein, wherein the method includes: masking one or more interrupts to begin non-preemptive execution of the sensitive code.

Example 11 includes the method of examples 1-10 and/or some other example(s) herein, wherein the second bridge instruction is a bridge instruction in a leave mode, and the method includes: bulk retiring all instructions not already retired after execution of the first bridge instruction.

Example 12 includes the method of example 11 and/or some other example(s) herein, wherein the method includes: unmasking one or more interrupts for preemptable execution of the user level code.

Example 13 includes the method of examples 11-12 and/or some other example(s) herein, wherein the method includes: implementing one or more fence instructions.

Example 14 includes the method of examples 1-13 and/or some other example(s) herein, wherein the μenclave is a first μenclave, the second bridge instruction is a bridge instruction in a connect mode, and the method includes: continuing non-preemptable execution of second sensitive code within a second μenclave after execution of the second bridge instruction without retiring instructions of the sensitive code of the first μenclave.

Example 15 includes the method of example 14 and/or some other example(s) herein, wherein the method includes: bulk retiring all instructions not already retired after execution of the first bridge instruction.

Example 16 includes the method of examples 1-15 and/or some other example(s) herein, wherein the μenclave is a first μenclave, and the method includes: enqueuing a key into a bidirectional buffer shared with a second μenclave, wherein the key points to a memory location storing data intended to be communicated between the first μenclave and the second μenclave.

Example 17 includes the method of example 16 and/or some other example(s) herein, wherein the method includes: dequeuing another key from the bidirectional buffer, wherein the other key is placed in the bidirectional buffer by the second μenclave; hashing the other key to obtain an index referring to another memory location where data for the first μenclave is stored; and accessing the data stored in the other memory location.

Example 18 includes the method of examples 2-17 and/or some other example(s) herein, wherein the executing the sensitive code includes: hashing a virtual address of at least one instruction of the sensitive code; identifying a decoded version of the at least one instruction in a sensitive instruction cache when the instruction has previously been decoded and executed; and decoding the instructions of the sensitive code using the decryption key when the decoded version of the at least one instruction is not included in the sensitive instruction cache.

Example 19 includes the method of example 18 and/or some other example(s) herein, wherein the method includes: providing a performance monitoring unit (PMU) with an encryption key, wherein the encryption key is for encrypting PMU events that occur during execution of the sensitive code.

Example 20 includes one or more computer readable media comprising instructions, wherein execution of the instructions by processor circuitry is to cause the processor circuitry to perform the method of examples 1-19 and/or some other example(s) herein.

Example 21 includes a computer program comprising the instructions of example 20 and/or some other example(s) herein.

Example 22 includes a n Application Programming Interface defining functions, methods, variables, data structures, and/or protocols for the computer program of example 21 and/or some other example(s) herein.

Example 23 includes a n apparatus comprising circuitry loaded with the instructions of example 20 and/or some other example(s) herein.

Example 24 includes a n apparatus comprising circuitry operable to run the instructions of example 20 and/or some other example(s) herein.

Example 25 includes a n integrated circuit comprising one or more of the processor circuitry of example 20 and the one or more computer readable media of example 20 and/or some other example(s) herein.

Example 26 includes a computing system comprising the one or more computer readable media and the processor circuitry of example 20 and/or some other example(s) herein.

Example 27 includes an apparatus comprising means for executing the instructions of example 20 and/or some other example(s) herein.

Example 28 includes a signal generated as a result of executing the instructions of example 20 and/or some other example(s) herein.

Example 29 includes a data unit generated as a result of executing the instructions of example 20 and/or some other example(s) herein.

Example 30 includes the data unit of example 29 and/or some other example(s) herein, the data unit is a datagram, network packet, data frame, data segment, a Protocol Data Unit (PDU), a Service Data Unit (SDU), a message, or a database object.

Example 31 includes a signal encoded with the data unit of examples 29-30 and/or some other example(s) herein.

Example 32 includes an electromagnetic signal carrying the instructions of example 20 and/or some other example(s) herein.

Example 33 includes an apparatus comprising means for performing the method of examples 1-19 and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive a stream of packets (or the following parameters and templates or template values).

The term "receipt" at least in some embodiments refers to any action (or set of actions) involved with receiving or obtaining an object, data, data unit, etc., and/or the fact of the object, data, data unit, etc. being received. The term "receipt" at least in some embodiments refers to an object, data, data unit, etc., being pushed to a device, system, element, etc. (e.g., often referred to as a push model), pulled by a device, system, element, etc. (e.g., often referred to as a pull model), and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some embodiments refers to the observation and/or quantification of attributes of an object, event, or phenomenon. Additionally or alternatively, the term "measurement" at least in some embodiments refers to a set of operations having the object of determining a measured value or measurement result, and/or the actual instance or execution of operations leading to a measured value.

The term "metric" at least in some embodiments refers to a standard definition of a quantity, produced in an assessment of performance and/or reliability of the network, which has an intended utility and is carefully specified to convey the exact meaning of a measured value.

The term "figure of merit" or "FOM" at least in some embodiments refers to a quantity used to characterize or measure the performance and/or effectiveness of a device, system or method, relative to its alternatives. Additionally or alternatively, the term "figure of merit" or "FOM" at least in some embodiments refers to one or more characteristics that makes something fit for a specific purpose.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The terms "ego" (as in, e.g., "ego device") and "subject" (as in, e.g., "data subject") at least in some embodiments refers to an entity, element, device, system, etc., that is under consideration or being considered. The terms "neighbor" and "proximate" (as in, e.g., "proximate device") at least in some embodiments refers to an entity, element, device, system, etc., other than an ego device or subject device.

The term "identifier" at least in some embodiments refers to a value, or a set of values, that uniquely identify an identity in a certain scope. Additionally or alternatively, the term "identifier" at least in some embodiments refers to a sequence of characters that identifies or otherwise indicates the identity of a unique object, element, or entity, or a unique class of objects, elements, or entities. Additionally or alternatively, the term "identifier" at least in some embodiments refers to a sequence of characters used to identify or refer to an application, program, session, object, element, entity, variable, set of data, and/or the like. The "sequence of characters" mentioned previously at least in some embodiments refers to one or more names, labels, words, numbers, letters, symbols, and/or any combination thereof. Additionally or alternatively, the term "identifier" at least in some embodiments refers to a name, address, label, distinguishing index, and/or attribute. Additionally or alternatively, the term "identifier" at least in some embodiments refers to an instance of identification. The term "persistent identifier" at least in some embodiments refers to an identifier that is reused by a device or by another device associated with the same person or group of persons for an indefinite period.

The term "identification" at least in some embodiments refers to a process of recognizing an identity as distinct from other identities in a particular scope or context, which may involve processing identifiers to reference an identity in an identity database.

The term "lightweight" or "lite" at least in some embodiments refers to an application or computer program designed to use a relatively small amount of resources such as having a relatively small memory footprint, low processor usage, and/or overall low usage of system resources. The term "lightweight protocol" at least in some embodiments refers to a communication protocol that is characterized by a relatively small overhead. Additionally or alternatively, the term "lightweight protocol" at least in some embodiments refers to a protocol that provides the same or enhanced services as a standard protocol, but performs faster than standard protocols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module. Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "scratchpad memory" or "scratchpad" at least in some embodiments refers to a relatively high-speed internal memory used for temporary storage of calculations, data, and/or other work in progress.

The terms "machine-readable medium" and "computer-readable medium" refers to tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EE-PROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP). A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions. In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine. The terms "machine-readable medium" and "computer-readable medium" may be interchangeable for purposes of the present disclosure. The term "non-transitory computer-readable medium at least in some embodiments refers to any type of memory, computer readable storage device, and/or storage disk and may exclude propagating signals and transmission media.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "scheduler" at least in some embodiments refers to an entity or element that assigns resources (e.g., processor time, network links, memory space, and/or the like) to perform tasks.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, is hub, bridge, radio network controller, network access node (NAN), base station, access point (AP), RAN device, RAN node, gateway, server, network appliance, network function (NF), virtualized NF (VNF), and/or the like.

The term "SmartNIC" at least in some embodiments refers to a network interface controller (NIC), network adapter, or a programmable network adapter card with programmable hardware accelerators and network connectivity (e.g., Ethernet or the like) that can offload various tasks or workloads from other compute nodes or compute platforms such as servers, application processors, and/or the like and accelerate those tasks or workloads. A SmartNIC has similar networking and offload capabilities as an IPU, but remains under the control of the host as a peripheral device.

The term "infrastructure processing unit" or "IPU" at least in some embodiments refers to an advanced networking device with hardened accelerators and network connectivity (e.g., Ethernet or the like) that accelerates and manages infrastructure functions using tightly coupled, dedicated, programmable cores. In some implementations, an IPU offers full infrastructure offload and provides an extra layer of security by serving as a control point of a host for running infrastructure applications. An IPU is capable of offloading the entire infrastructure stack from the host and can control how the host attaches to this infrastructure. This gives service providers an extra layer of security and control, enforced in hardware by the IPU.

The term "network access node" or "NAN" at least in some embodiments refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), OSs, virtual machines (VMs), software/applications, computer files, and/or the like. A "hardware resource" at least in some embodiments refers to compute, storage, and/or network resources provided by physical hardware element(s). A "virtualized resource" at least in some embodiments refers to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to any kind of shared entities to provide services, and may include computing and/or network resources.

System resources may be considered as a set of coherent functions, network data objects or services, accessible through a server where such system resources reside on a single host or multiple hosts and are clearly identifiable.

The term "network function" or "NF" at least in some embodiments refers to a functional block within a network infrastructure that has one or more external interfaces and a defined functional behavior. The term "network service" or "NS" at least in some embodiments refers to a composition of Network Function(s) and/or Network Service(s), defined by its functional and behavioral specification(s).

The term "network function virtualization" or "NFV" at least in some embodiments refers to the principle of separating network functions from the hardware they run on by using virtualization techniques and/or virtualization technologies. The term "virtualized network function" or "VNF" at least in some embodiments refers to an implementation of an NF that can be deployed on a Network Function Virtualization Infrastructure (NFVI). The term "Network Functions Virtualization Infrastructure Manager" or "NFVI" at least in some embodiments refers to a totality of all hardware and software components that build up the environment in which VNFs are deployed. The term "Virtualized Infrastructure Manager" or "VIM" at least in some embodiments refers to a functional block that is responsible for controlling and managing the NFVI compute, storage and network resources, usually within one operator's infrastructure domain.

The term "virtualization container", "execution container", or "container" at least in some embodiments refers to a partition of a compute node that provides an isolated virtualized computation environment. The term "OS container" at least in some embodiments refers to a virtualization container utilizing a shared Operating System (OS) kernel of its host, where the host providing the shared OS kernel can be a physical compute node or another virtualization container. Additionally or alternatively, the term "container" at least in some embodiments refers to a standard unit of software (or a package) including code and its relevant dependencies, and/or an abstraction at the application layer that packages code and dependencies together. Additionally or alternatively, the term "container" or "container image" at least in some embodiments refers to a lightweight, standalone, executable software package that includes everything needed to run an application such as, for example, code, runtime environment, system tools, system libraries, and settings.

The term "virtual machine" or "VM" at least in some embodiments refers to a virtualized computation environment that behaves in a same or similar manner as a physical computer and/or a server. The term "hypervisor" at least in some embodiments refers to a software element that partitions the underlying physical resources of a compute node, creates VMs, manages resources for VMs, and isolates individual VMs from each other.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "RAT type" at least in some embodiments may identify a transmission technology and/or communication protocol used in an access network, for example, new radio (NR), Long Term Evolution (LTE), narrowband IoT (NB-IOT), untrusted non-3GPP, trusted non-3GPP, trusted Institute of Electrical and Electronics Engineers (IEEE) 802 (e.g., [IEEE80211]; see also *IEEE Standard for Local and Metropolitan Area Networks: Overview and Architecture*, IEEE Std 802-2014, pp. 1-74 (30 Jun. 2014) ("REEE8021"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), etc.); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), etc.), Generic Access Network (GAN)/Unlicensed Mobile Access (UMA), High Speed Packet Access (HSPA) (and variants thereof such as HSPA Plus (HSPA+), etc.), Long Term Evolution (LTE) (and variants thereof such as LTE-Advanced (LTE-A), Evolved UTRA (E-UTRA), LTE Extra, LTE-A Pro, LTE LAA, MuLTEfire, etc.), Fifth Generation (5G) or New Radio (NR), etc.; ETSI technologies such as High Performance Radio Metropolitan Area Network (HiperMAN) and the like; IEEE technologies such as [IEEE802] and/or WiFi (e.g., [IEEE80211] and variants thereof), Worldwide Interoperability for Microwave Access (WiMAX) (e.g., [WiMAX] and variants thereof), Mobile Broadband Wireless Access (MBWA)/iBurst (e.g., IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), etc.), IEEE 802.15 technologies/standards (e.g., IEEE Standard for Low-Rate Wireless Networks, IEEE Std 802.15.4-2020, pp. 1-800 (23 Jul. 2020) ("[IEEE802154]"), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular Environments, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-GSB, ITS-GSC, etc.); Sigfox; Mobitex; 3GPP2 technologies such as cdmaOne (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), etc.); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, etc.); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. For purposes of the present disclosure, the terms "traffic flow", "data flow", "dataflow", "packet flow", "network flow", and/or "flow" may be used interchangeably even though these terms at least in some embodiments refers to different concepts. The term "dataflow" or "data flow" at least in some embodiments refers to the movement of data through a system including software elements, hardware elements, or a combination of both software and hardware elements. Additionally or alternatively, the term "dataflow" or "data flow" at least in some embodiments refers to a path taken by a set of data from an origination or source to destination that includes all nodes through which the set of data travels.

The term "stream" at least in some embodiments refers to a sequence of data elements made available over time. At least in some embodiments, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some embodiments refers to a manner of processing in which an object is not represented by a complete logical data structure of nodes occupying memory proportional to a size of that object, but are processed "on the fly" as a sequence of events.

The term "distributed computing" at least in some embodiments refers to computation resources that are geographically distributed within the vicinity of one or more localized networks' terminations. The term "distributed computations" at least in some embodiments refers to a model in which components located on networked computers communicate and coordinate their actions by passing messages interacting with each other in order to achieve a common goal.

The term "service" at least in some embodiments refers to the provision of a discrete function within a system and/or environment. Additionally or alternatively, the term "service" at least in some embodiments refers to a functionality or a set of functionalities that can be reused. The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. Additionally or alternatively, the term "microservice architecture" at least in some embodiments refers to a variant of the service-oriented architecture (SOA) structural style wherein applications are arranged as a collection of loosely-coupled services (e.g., fine-grained services) and may use lightweight protocols. The term "network service" at least in some embodiments refers to a composition of Network Function(s) and/or Network Service(s), defined by its functional and behavioral specification.

The term "session" at least in some embodiments refers to a temporary and interactive information interchange between two or more communicating devices, two or more application instances, between a computer and user, and/or between any two or more entities or elements. Additionally or alternatively, the term "session" at least in some embodiments refers to a connectivity service or other service that provides or enables the exchange of data between two entities or elements. The term "network session" at least in some embodiments refers to a session between two or more communicating devices over a network. The term "web session" at least in some embodiments refers to session between two or more communicating devices over the Internet or some other network. The term "session identifier, " "session ID," or "session token" at least in some embodiments refers to a piece of data that is used in network communications to identify a session and/or a series of message exchanges.

The term "quality" at least in some embodiments refers to a property, character, attribute, or feature of something as being affirmative or negative, and/or a degree of excellence of something. Additionally or alternatively, the term "quality" at least in some embodiments, in the context of data processing, refers to a state of qualitative and/or quantitative aspects of data, processes, and/or some other aspects of data processing systems. The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some embodiments refers to mechanisms that provide traffic-forwarding treatment based on flow-specific traffic classification. In some implementations, the term "Quality of Service" or "QoS" can be used interchangeably with the term "Class of Service" or "CoS".

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, Radio Network Temporary Identifier (RNTI), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some embodiments refers to an identifier that can be mapped to a specific application or application instance.

The term "application" at least in some embodiments refers to a computer program designed to carry out a specific task other than one relating to the operation of the computer itself. Additionally or alternatively, term "application" at least in some embodiments refers to a complete and deployable package, environment to achieve a certain function in an operational environment.

The term "process" at least in some embodiments refers to an instance of a computer program that is being executed by one or more threads. In some implementations, a process may be made up of multiple threads of execution that execute instructions concurrently.

The term "thread of execution" or "thread" at least in some embodiments refers to the smallest sequence of programmed instructions that can be managed independently by a scheduler, The term "lightweight thread" or "light-weight thread" at least in some embodiments refers to a computer program process and/or a thread that can share address space and resources with one or more other threads, reducing context switching time during execution. In some implementations, term "lightweight thread" or "light-weight thread" can be referred to or used interchangeably with the terms "pico-thread", "strand", "tasklet", "fiber", "task", or "work item" even though these terms may refer to difference concepts.

The term "fiber" at least in some embodiments refers to a lightweight thread that shares address space with other fibers, and uses cooperative multitasking (whereas threads typically use preemptive multitasking).

The term "fence instruction", "memory barrier", "memory fence", or "membar" at least in some embodiments refers to a barrier instruction that causes a processor or compiler to enforce an ordering constraint on memory operations issued before and/or after the instruction. The term "barrier" or "barrier instruction" at least in some embodiments refers to a synchronization method for a group of threads or processes in source code wherein any thread/process must stop at a point of the barrier and cannot proceed until all other threads/processes reach the barrier.

The term "instantiate" or "instantiation" at least in some embodiments refers to the creation of an instance. The term "instance" at least in some embodiments refers to a concrete occurrence of an object, which may occur, for example, during execution of program code.

The term "context switch" at least in some embodiments refers to the process of storing the state of a process or thread so that it can be restored to resume execution at a later point.

The term "algorithm" at least in some embodiments refers to an unambiguous specification of how to solve a problem or a class of problems by performing calculations, input/output operations, data processing, automated reasoning tasks, and/or the like.

The term "application programming interface" or "API" at least in some embodiments refers to a set of subroutine definitions, communication protocols, and tools for building software. Additionally or alternatively, the term "application programming interface" or "API" at least in some embodiments refers to a set of clearly defined methods of communication among various components. An API may be for a web-based system, operating system, database system, computer hardware, or software library.

The term "reference" at least in some embodiments refers to data useable to locate other data and may be implemented a variety of ways (e.g., a pointer, an index, a handle, a key, an identifier, a hyperlink, and/or the like).

The term "translation" at least in some embodiments refers to a process of converting or otherwise changing data from a first form, shape, configuration, structure, arrangement, description, embodiment, or the like into a second form, shape, configuration, structure, arrangement, embodiment, description, or the like.

The term "transcoding" at least in some embodiments refers to taking information/data in one format and translating the same information/data into another format in the same sequence. Additionally or alternatively, the term "transcoding" at least in some embodiments refers to taking the same information, in the same sequence, and packaging the information (e.g., bits or bytes) differently.

The term "transformation" at least in some embodiments refers to changing data from one format and writing it in another format, keeping the same order, sequence, and/or nesting of data items. Additionally or alternatively, the term "transformation" at least in some embodiments involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some embodiments refers to changing the schema of a data object to another schema.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "data processing" or "processing" at least in some embodiments refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "user" at least in some embodiments refers to an abstract representation of any entity issuing command requests to a service provider and/or receiving services from a service provider.

The term "cache" at least in some embodiments refers to a hardware and/or software component that stores data so that future requests for that data can be served faster. The term "cache hit" at least in some embodiments refers to the event of requested data being found in a cache; cache hits are served by reading data from the cache, which is faster than re-computing a result or reading from a slower data store. The term "cache miss" at least in some embodiments refers to the event of requested data not being found in a cache.

The term "lookaside cache" at least in some embodiments refers to a memory cache that shares the system bus with main memory and other subsystems.

The term "inline cache" at least in some embodiments refers to a memory cache that resides next to a processor and shares the same system bus as other subsystems in the computer system.

The term "backside cache" at least in some embodiments refers to level 2 (L2) memory cache that has a dedicated channel to a processor.

The term "exception" at least in some embodiments refers to an event that can cause a currently executing program to be suspended. Additionally or alternatively, the term "exception" at least in some embodiments refers to an exception is an event that typically occurs when an instruction causes an error. Additionally or alternatively, the term "exception" at least in some embodiments refers to an event or a set of circumstances for which executing code will terminate normal operation. The term "exception" at least in some embodiments can also be referred to as an "interrupt."

The term "interrupt" at least in some embodiments refers to a signal or request to interrupt currently executing code (when permitted) so that events can be processed in a timely manner. If the interrupt is accepted, the processor will suspend its current activities, save its state, and execute an interrupt handler (or an interrupt service routine (ISR)) to deal with the event. The term "masking an interrupt" or "masked interrupt" at least in some embodiments refers to disabling an interrupt, and the term "unmasking an interrupt" or "unmasked interrupt" at least in some embodiments refers to enabling an interrupt. In some implementations, a processor may have an internal interrupt mask register to enable or disable specified interrupts.

The term "data unit" at least in some embodiments refers to a basic transfer unit associated with a packet-switched network; a data unit may be structured to have header and payload sections. The term "data unit" at least in some embodiments may be synonymous with any of the following terms, even though they may refer to different aspects: "datagram", a "protocol data unit" or "PDU", a "service data unit" or "SDU", "frame", "packet", a "network packet", "segment", "block", "cell", "chunk", and/or the like. Examples of data units, network packets, and the like, include internet protocol (IP) packet, Internet Control Message Protocol (ICMP) packet, UDP packet, TCP packet, SCTP packet, ICMP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in a REEE8021 protocol/standard (e.g., [IEEE80211] or the like), and/or other like data structures.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "hash table" at least in some embodiments refers to a data structure that implements an associative array and/or a structure that can map keys to values, wherein a hash function is used to compute an index (or a hash code) into an array of buckets (or slots) from which the desired value can be found. During lookup, a key is hashed and the resulting hash indicates where the corresponding value is stored.

The term "consistent hashing" at least in some embodiments refers to a hashing technique wherein, when a hash table is resized, only n/m keys need to be remapped on average where n is the number of keys and m is the number of slots. In contrast, in most traditional hash tables, a change in the number of array slots causes nearly all keys to be remapped because the mapping between the keys and the slots is defined by a modular operation.

The term "enclave" at least in some embodiments refers to a private or isolated region of computer memory. Additionally or alternatively, the term "enclave" at least in some embodiments refers to an isolated region of code and/or data within an address space of a secure application, where only code executed within the enclave can access data within the enclave. Additionally or alternatively, the term "enclave" at least in some embodiments refers to a protected memory region that provides confidentiality for data and code execution. Additionally or alternatively, the term "enclave" at least in some embodiments refers to an instance of a Trusted Execution Environment (TEE), which is usually secured by hardware.

The term "sensitive code" or "privileged code" at least in some embodiments refers to code that accesses secured resources and/or performs security sensitive operations.

The term "secure resources" at least in some embodiments refers to resources that require security permissions to access such as, for example, a file system, databases, registry, event log, Web services, sockets, DNS databases, directory services, and environment variables.

The term "unforgeability" at least in some embodiments refers to an inability to generate valid ciphertexts, or an ability to protect against ciphertext attacks. Additionally or alternatively, the term "unforgeability" at least in some embodiments refers to a scheme that does not allow an adversary to generate an authenticated message, access credentials (i.e., a forgery), or otherwise access resources.

The term "sandbox" at least in some embodiments refers to a security mechanism for separating running applications of program code to prevent system failures and/or software vulnerabilities from spreading to other systems.

The term "model-specific register" or "MSR" at least in some embodiments refers to various control registers in the x86 instruction set used for debugging, program execution tracing, performance monitoring, and toggling certain CPU features.

The term "micro-op", "uOp", or "μop" at least in some embodiments refers to a low-level hardware operation decoded from program code. Additionally or alternatively, the term "micro-op", "uOp", or "μop" at least in some embodiments refers to microcode, or hardware-level instructions that implement higher-level machine code instructions or internal finite-state machine sequencing in one or more digital processing elements.

The term "system call" or "syscall" at least in some embodiments refers to the programmatic way in which a computer program requests a service from the kernel of an operating system (OS) on which it is executed.

The term "operating system" or "OS" at least in some embodiments refers to system software that manages hardware resources, software resources, and provides common services for computer programs.

The term "kernel" at least in some embodiments refers to a portion of OS code that is resident in memory and facilitates interactions between hardware and software components.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to provide micro-enclave services, the apparatus comprising:

memory circuitry arranged to isolate a micro-enclave memory space for the micro-enclave services from other memory spaces of the memory circuitry, wherein the memory circuitry is to:

store user level code of an application, and store sensitive code within a micro-enclave, wherein the sensitive code comprises library functions split off from a privileged runtime that read and write hardware registers and resource counters in operating system, set up timers, defer preemption events, and are compiled separately and installed as static unforgeable procedures that do not yield operating system scheduler control; and processor circuitry connected to the memory circuitry, wherein the processor circuitry is to:

execute, during execution of the user level code, a first bridge instruction of the micro-enclave indicating entry into the micro-enclave;

execute the sensitive code within the micro-enclave after execution of the first bridge instruction, wherein execution continues on a normal stack of the application;

execute a second bridge instruction of the micro-enclave to exit the micro-enclave; and resume execution of the user level code after execution of the second bridge instruction.

2. The apparatus of claim 1, wherein the first bridge instruction is a bridge instruction in an enter mode, and the processor circuitry is to:

receive a token in a designated register;

translate the token into a length and a decryption key, wherein the length is a number of data units of the sensitive code between the first bridge instruction and the second bridge instruction; and decode, using the decryption key, instructions of the sensitive code into a scratchpad memory.

3. The apparatus of claim 2, wherein the number of data units of the length includes the sensitive code between the first bridge instruction and the second bridge instruction and including a number of data units of the first bridge instruction and the second bridge instruction.

4. The apparatus of claim 2, wherein, to execute the sensitive code, the processor circuitry is to:

execute the decoded instructions without retiring the instructions of the sensitive code until the second bridge instruction is reached.

5. The apparatus of claim 2, wherein, to execute the sensitive code, the processor circuitry is, when an exception occurs during execution of the sensitive code, to:

set a program counter back to a beginning of the first bridge instruction;

suppress the exception;

deliver a signal frame to the application, wherein the signal frame includes the exception that occurred during execution of the sensitive code; and terminate execution of the sensitive code when the application does not receive the signal frame.

6. The apparatus of claim 2, wherein the processor circuitry is to:

mask one or more interrupts to begin non-preemptive execution of the sensitive code.

7. The apparatus of claim 1, wherein the second bridge instruction is a bridge instruction in a leave mode, and the processor circuitry is to:

bulk retire all instructions not already retired after execution of the first bridge instruction.

8. The apparatus of claim 7, wherein the processor circuitry is to:

unmask one or more interrupts for pre-emptible execution of the user level code.

9. The apparatus of claim 7, wherein the processor circuitry is to:

implement one or more fence instructions.

10. The apparatus of claim 1, wherein the micro-enclave is a first micro-enclave, the second bridge instruction is a bridge instruction in a connect mode, and the processor circuitry is to:

continue non-pre-emptible execution of second sensitive code within a second micro-enclave after execution of the second bridge instruction without retiring instructions of the sensitive code of the first micro-enclave; and bulk retire all instructions not already retired after execution of the first bridge instruction.

11. The apparatus of claim 1, wherein the micro-enclave is a first micro-enclave, and the processor circuitry is to:

enqueue a key into a bidirectional buffer shared with a second micro-enclave, wherein the enqueued key points to a memory location storing data intended to be communicated between the first micro-enclave and the second micro-enclave.

12. The apparatus of claim 1, wherein the micro-enclave is a first micro-enclave, and the processor circuitry is to:

dequeue a key from a bidirectional buffer shared with a second micro-enclave, wherein the key is placed in the bidirectional buffer by the second micro-enclave;

hash the key to obtain an index referencing a memory location where data for the first micro-enclave is stored; and access the data stored in the referenced memory location.

13. The apparatus of claim 2, wherein, to execute the sensitive code, the processor circuitry is to:

hash a virtual address of at least one instruction of the sensitive code;

identify a decoded version of the at least one instruction in a sensitive instruction cache when the at least one instruction of the sensitive code has previously been decoded and executed; and decode the instructions of the sensitive code using the decryption key when the decoded version of the at least one instruction is not included in the sensitive instruction cache.

14. The apparatus of claim 13, wherein the processor circuitry is to:

provide performance monitoring unit (PMU) with an encryption key, wherein the encryption key is for encrypting PMU events that occur during execution of the sensitive code.

15. One or more non-transitory computer-readable media (NTCRM) comprising instructions for operating a micro-enclave, wherein execution of the instructions by a compute node is to cause the compute node to:

during execution of user level code of an application, execute a first bridge instruction of the micro-enclave, the first bridge instruction for entry into the micro-enclave, and the micro-enclave includes sensitive code, wherein the sensitive code comprises library functions split off from a privileged runtime that read and write hardware registers and resource counters in operating system, set up timers, defer preemption events, and are compiled separately and installed as static unforgeable procedures that do not yield operating system scheduler control;

hash a virtual address of the sensitive code;

identify, using the hashed virtual address, an already decoded version of the sensitive code in a decoded sensitive instruction cache (DSIC) when an instruction of the sensitive code has previously been decoded and executed;

decode instructions of the sensitive code using a decryption key when no previously decoded version of the sensitive code is in the DSIC;

execute the decoded instructions of the sensitive code within the micro-enclave after execution of the first bridge instruction, wherein execution continues on a normal stack of the application;

execute a second bridge instruction to exit the micro-enclave; and resume execution of the user level code after execution of the second bridge instruction.

16. The one or more NTCRM of claim 15, wherein the first bridge instruction is a bridge instruction in an enter mode, and execution of the instructions is to cause the compute node to decode the instructions of the sensitive code including:

receive a token in a designated register;

translate the token into a length and the decryption key, wherein the length is a number of data units of the sensitive code between the first bridge instruction and the second bridge instruction; and decode, using the decryption key, the instructions of the sensitive code into a scratchpad memory.

17. The one or more NTCRM of claim 16, wherein execution of the instructions is to cause the compute node to:

execute the decoded instructions without retiring the instructions of the sensitive code until the second bridge instruction is reached; and

mask one or more interrupts to begin non-preemptive
execution of the sensitive code.

18. The one or more NTCRM of claim 17, wherein, when
an exception occurs during execution of the sensitive code,
execution of the instructions is to cause the compute node to:
set a program counter back to a beginning of the first
bridge instruction;
suppress the exception;
deliver a signal frame to the application, wherein the
signal frame includes the exception that occurred dur-
ing execution of the sensitive code; and
terminate execution of the sensitive code when the appli-
cation does not receive the signal frame.

19. The one or more NTCRM of claim 15, wherein the
second bridge instruction is a bridge instruction in a leave
mode, and execution of the instructions is to cause the
compute node to:
bulk retire all instructions not already retired after execu-
tion of the first bridge instruction; and
unmask one or more interrupts for pre-emptible execution
of the user level code.

20. The one or more NTCRM of claim 15, wherein the
micro-enclave is a first micro-enclave, the second bridge
instruction is a bridge instruction in a connect mode, and
execution of the instructions is to cause the compute node to:
continue non-pre-emptible execution of second sensitive
code within a second micro-enclave after execution of
the second bridge instruction without retiring instruc-
tions of the sensitive code of the first micro-enclave;
and
bulk retire all instructions not already retired after execu-
tion of the first bridge instruction.

21. A method of sensitive code execution in a micro-
enclave, the method comprising:
during execution of user level code of an application,
executing a first bridge instruction in an enter mode,
and when the first bridge instruction is in the enter
mode,
receiving a token in a designated register,
translating the token into a length and a decryption key,
wherein the length is a number of data units of the
sensitive code between the first bridge instruction
and a second bridge instruction,
decoding, using the decryption key, instructions of the
sensitive code into a scratchpad memory,
executing the decoded instructions of the sensitive code
within the micro-enclave after execution of the first bridge instruction without retiring any of the
decoded instructions until the second bridge instruc-
tion is reached, wherein execution continues on a
normal stack of the application, and wherein the
sensitive code comprises library functions split off
from a privileged runtime that read and write hard-
ware registers and resource counters in operating
system, set up timers, defer preemption events, and
are compiled separately and installed as static
unforgeable procedures that do not yield operating
system scheduler control;
executing the second bridge instruction not in the enter
mode to exit the micro-enclave; and
resuming execution of the user level code after execution
of the second bridge instruction.

22. The method of claim 21, wherein, when an exception
occurs during execution of the sensitive code, the method
includes:
setting a program counter back to a beginning of the first
bridge instruction;
suppressing the exception;
delivering a signal frame to the application including the
exception that occurred during the execution of the
sensitive code; and
terminating the execution of the sensitive code when the
application does not receive the signal frame.

23. The method of claim 22, wherein the method includes:
masking one or more interrupts to begin non-preemptive
execution of the sensitive code.

24. The method of claim 21, wherein the micro-enclave is
a first micro-enclave, and the method includes:
enqueuing a key into a bidirectional buffer shared with a
second micro-enclave, wherein the enqueued key
points to a memory location storing data intended to be
communicated between the first micro-enclave and the
second micro-enclave.

25. The method of claim 21, wherein the micro-enclave is
a first micro-enclave, and the method includes:
dequeuing a key from a bidirectional buffer shared with a
second micro-enclave, wherein the key is placed in the
bidirectional buffer by the second micro-enclave;
hashing the key to obtain an index referencing a memory
location where data for the first micro-enclave is stored;
and
accessing the data stored in the referenced memory loca-
tion.

* * * * *